US008734643B2

(12) United States Patent
Foret

(10) Patent No.: US 8,734,643 B2
(45) Date of Patent: *May 27, 2014

(54) APPARATUS FOR TREATING A SUBSTANCE WITH WAVE ENERGY FROM AN ELECTRICAL ARC AND A SECOND SOURCE

(75) Inventor: Todd Foret, Lafayette, LA (US)

(73) Assignee: Foret Plasma Labs, LLC, The Woodlands, TX (US)

(*) Notice: Subject to any disclaimer, the term of this patent is extended or adjusted under 35 U.S.C. 154(b) by 337 days.

This patent is subject to a terminal disclaimer.

(21) Appl. No.: 13/186,755

(22) Filed: Jul. 20, 2011

(65) Prior Publication Data

US 2011/0300029 A1 Dec. 8, 2011

Related U.S. Application Data

(60) Continuation-in-part of application No. 12/949,736, filed on Nov. 18, 2010, now Pat. No. 8,002,992, and a continuation-in-part of application No. 12/577,130, filed on Oct. 9, 2009, now Pat. No. 8,324,523, said application No. 12/949,736 is a division of application No. 11/784,326, filed on Apr. 5, 2007, now Pat. No. 7,857,972, which is a continuation-in-part of application No. 10/935,789, filed on Sep. 7, 2004, now Pat. No. 7,422,695, said application No. 12/577,130 is a continuation of application No. 10/196,466, filed on Jul. 15, 2002, now Pat. No. 7,622,693.

(60) Provisional application No. 60/500,445, filed on Sep. 5, 2003, provisional application No. 60/789,670, filed on Apr. 5, 2006, provisional application No. 60/305,833, filed on Jul. 16, 2001.

(51) Int. Cl.
*C02F 1/32* (2006.01)

(52) U.S. Cl.
USPC .................. 210/198.1; 210/243; 210/512.1

(58) Field of Classification Search
USPC ............ 210/198.1, 243, 512.1; 250/434, 436, 250/438; 422/186.21, 189.29, 186.3
See application file for complete search history.

(56) References Cited

U.S. PATENT DOCUMENTS

| 1,698,096 A | 1/1929 | Hirschfeld |
| 1,727,361 A | 9/1929 | Ashcraft |

(Continued)

FOREIGN PATENT DOCUMENTS

| KR | 10-2004-0005107 | 1/2004 |
| WO | 94/16809 | 8/1994 |

(Continued)

OTHER PUBLICATIONS

Extended European Search Report for Application No. 07755050.7, dated Dec. 29, 2011, 38 pages.

(Continued)

*Primary Examiner* — Matthew O Savage
(74) *Attorney, Agent, or Firm* — Daniel J. Chalker; Edwin S. Flores; Chalker Flores, LLP

(57) ABSTRACT

An apparatus for treating a substance includes: (a) a volute or cyclone head, (b) a throat connected to the volute or cyclone head, (c) a parabolic reflector connected to the throat, (d) a first wave energy source comprising a first electrode within the volute or cyclone head that extends through the outlet into the first opening of the throat along the central axis of the throat, and a second electrode extending into the parabolic reflector proximate to the focus wherein the second electrode is spaced apart and axially aligned with first electrode, and (e) a second wave energy source disposed inside the throat, embedded within the throat or disposed around the throat. The substance is supplied to the inlet of the volute or cyclone head and is irradiated with one or more wave energies produced by the first and second wave energy sources.

56 Claims, 13 Drawing Sheets

(56) References Cited

U.S. PATENT DOCUMENTS

| | | |
|---|---|---|
| 2,139,657 A | 12/1938 | Baeckler |
| 2,260,823 A | 10/1941 | Bettis |
| 2,705,219 A | 3/1955 | Heiskell et al. |
| 3,201,337 A | 8/1965 | Eichelberger et al. |
| 3,254,770 A | 6/1966 | Herndon |
| 3,292,028 A | 12/1966 | Van Ornum |
| 3,324,334 A | 6/1967 | Reed |
| 3,567,921 A | 3/1971 | Holiday |
| 3,769,517 A | 10/1973 | Coleman |
| 3,772,172 A | 11/1973 | Zhagatspanian et al. |
| 3,826,920 A | 7/1974 | Woodroffe et al. |
| 3,917,479 A | 11/1975 | Sayce et al. |
| 3,924,246 A | 12/1975 | Scherer |
| 3,998,477 A | 12/1976 | Delahaye et al. |
| 4,002,918 A | 1/1977 | Graentzel |
| 4,279,743 A | 7/1981 | Miller |
| 4,296,066 A | 10/1981 | Schenck |
| 4,317,041 A | 2/1982 | Schenck |
| 4,381,978 A | 5/1983 | Gratzel et al. |
| 4,397,823 A | 8/1983 | Dimpfl |
| 4,427,636 A | 1/1984 | Obenshain |
| 4,448,935 A | 5/1984 | Iovine et al. |
| 4,454,835 A | 6/1984 | Walsh et al. |
| 4,476,105 A | 10/1984 | Greenbaum |
| 4,488,935 A | 12/1984 | Ruhe |
| 4,544,470 A | 10/1985 | Hetrick |
| 4,622,115 A | 11/1986 | O'Neill |
| 4,626,648 A | 12/1986 | Browning |
| 4,774,026 A | 9/1988 | Kitamori et al. |
| 4,803,365 A | 2/1989 | Krause et al. |
| 4,863,608 A | 9/1989 | Kawai et al. |
| 4,868,127 A | 9/1989 | Blades et al. |
| 4,948,980 A | 8/1990 | Wedekamp |
| 4,957,773 A | 9/1990 | Spencer et al. |
| 5,019,256 A | 5/1991 | Ifill et al. |
| 5,045,288 A | 9/1991 | Raupp et al. |
| 5,094,815 A | 3/1992 | Conboy et al. |
| 5,120,450 A | 6/1992 | Stanley, Jr. |
| 5,124,131 A | 6/1992 | Wekhof |
| 5,126,111 A | 6/1992 | Al-Ekabi et al. |
| 5,149,377 A | 9/1992 | Esrom et al. |
| 5,166,950 A | 11/1992 | Jouvaud et al. |
| 5,200,156 A | 4/1993 | Wedekamp |
| 5,227,053 A | 7/1993 | Brym |
| 5,413,768 A | 5/1995 | Stanley, Jr. |
| 5,439,595 A | 8/1995 | Downey, Jr. |
| 5,439,652 A | 8/1995 | Sczechowski et al. |
| 5,472,567 A | 12/1995 | Torregrossa |
| 5,529,701 A | 6/1996 | Grisham et al. |
| 5,531,904 A | 7/1996 | Grisham et al. |
| 5,611,896 A | 3/1997 | Swanepoel et al. |
| 5,662,811 A | 9/1997 | Grisham et al. |
| 5,664,733 A | 9/1997 | Lott |
| 5,680,014 A | 10/1997 | Miyamoto et al. |
| 5,696,380 A | 12/1997 | Cooke et al. |
| 5,730,875 A | 3/1998 | Grisham et al. |
| 5,832,361 A | 11/1998 | Foret |
| 5,866,910 A | 2/1999 | Cooke et al. |
| 5,994,705 A | 11/1999 | Cooke et al. |
| 6,004,386 A | 12/1999 | Grisham et al. |
| 6,019,947 A | 2/2000 | Kucherov |
| 6,054,097 A | 4/2000 | Mass et al. |
| 6,090,296 A | 7/2000 | Oster |
| 6,117,401 A | 9/2000 | Juvan |
| 6,187,206 B1 | 2/2001 | Bernier et al. |
| 6,355,178 B1 | 3/2002 | Couture et al. |
| 6,565,803 B1 | 5/2003 | Bolton et al. |
| 6,630,113 B1 | 10/2003 | Surma |
| 6,693,253 B2 | 2/2004 | Boulos et al. |
| 6,713,771 B2 | 3/2004 | Nakagawa et al. |
| 6,987,792 B2 | 1/2006 | Do et al. |
| 7,422,695 B2 | 9/2008 | Foret |
| 7,578,937 B2 | 8/2009 | Foret |
| 7,857,972 B2 | 12/2010 | Foret |
| 7,882,646 B2 | 2/2011 | Gorbell, et al. |
| 7,905,942 B1 | 3/2011 | Layman |
| 7,985,342 B2 | 7/2011 | Foret |
| 8,002,992 B2 | 8/2011 | Foret |
| 8,110,100 B2 | 2/2012 | Foret |
| 8,337,709 B2 | 12/2012 | Foret |
| 8,338,709 B2 | 12/2012 | Kodama et al. |
| 8,343,342 B2 | 1/2013 | Foret |
| 8,366,925 B2 | 2/2013 | Foret |
| 2001/0047964 A1 | 12/2001 | Matherly et al. |
| 2004/0020188 A1 | 2/2004 | Kramer et al. |
| 2006/0163054 A1 | 7/2006 | Spitzl et al. |
| 2006/0252974 A1 | 11/2006 | McVey et al. |

FOREIGN PATENT DOCUMENTS

| | | |
|---|---|---|
| WO | 9416809 A1 | 8/1994 |
| WO | 99/04607 | 1/1999 |

OTHER PUBLICATIONS

International Search Report and Written Opinion for PCT/US2007/008640 dated Sep. 25, 2007.

International Search Report and Written Opinion for PCT/US2009/033979 dated Sep. 15, 2009.

Lectures: On Illuminating Engineering Delivered at the John Hopkins University, Published 1911 Johns Hopkins Press, p. 140.

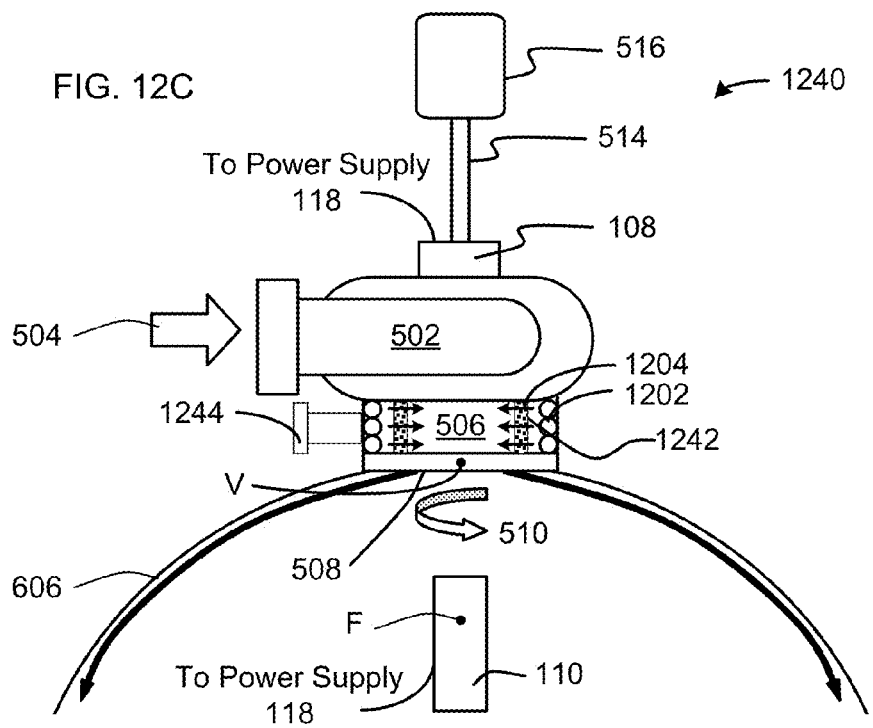
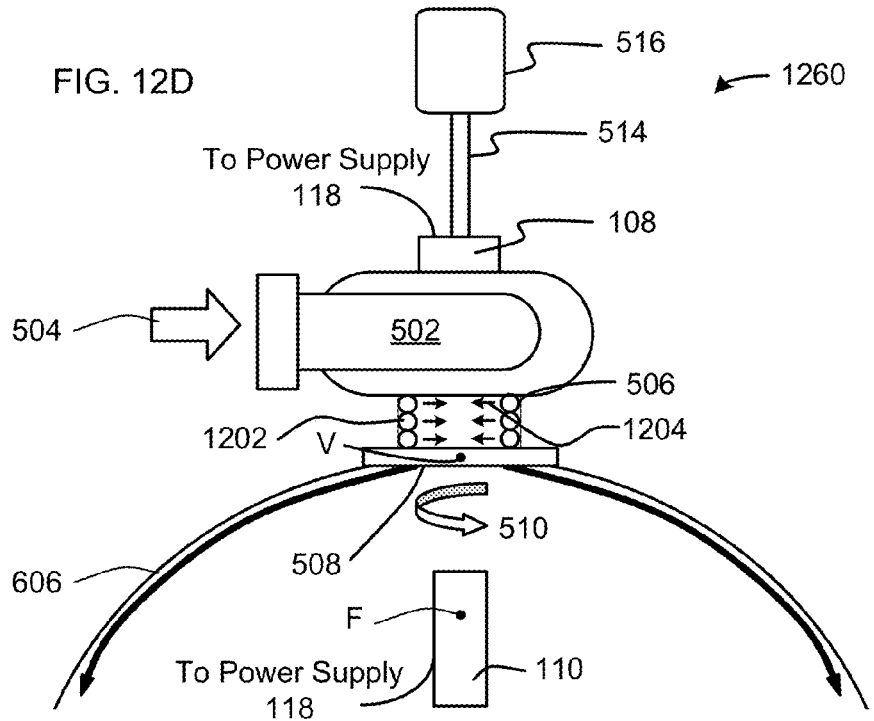

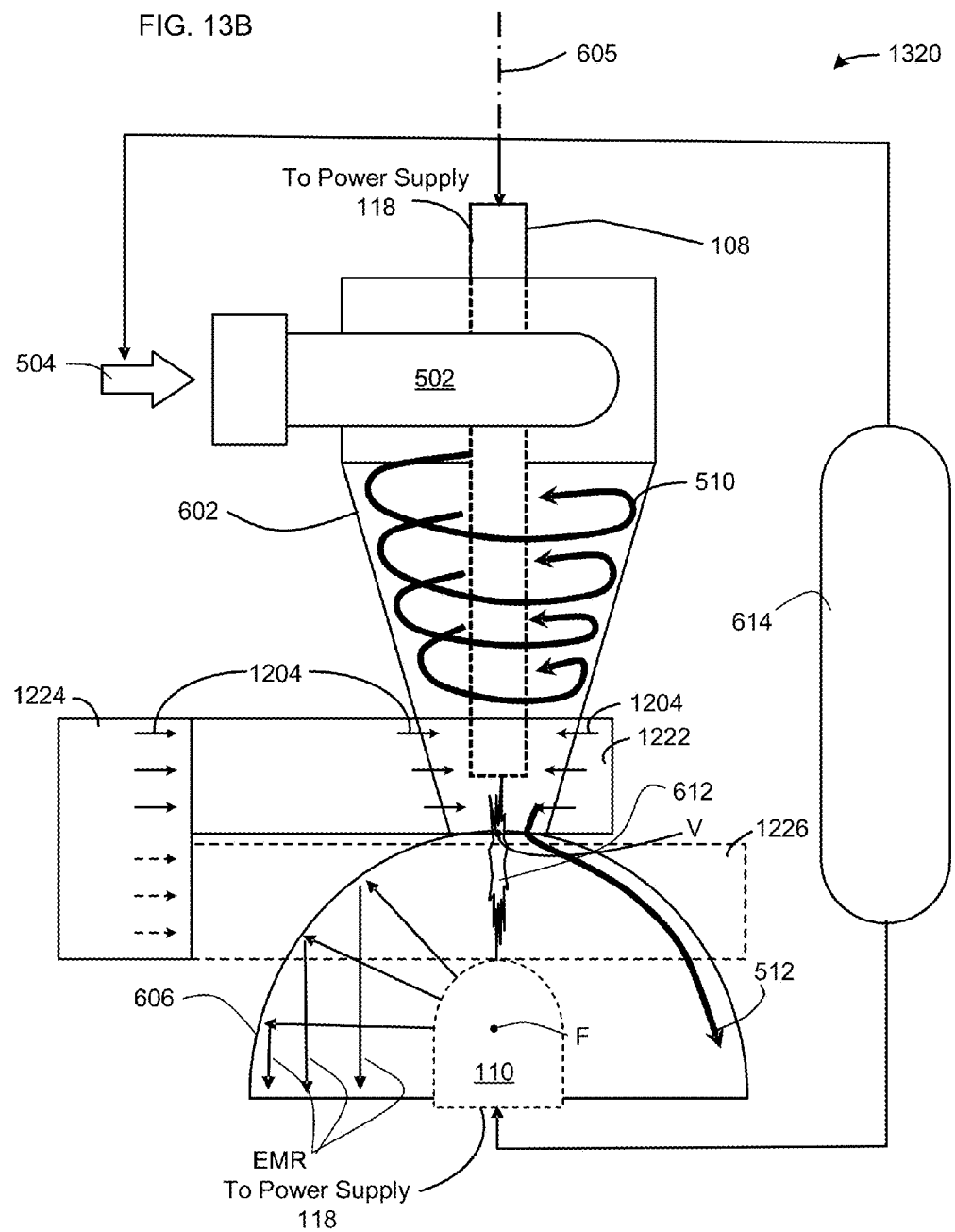

APPARATUS FOR TREATING A SUBSTANCE WITH WAVE ENERGY FROM AN ELECTRICAL ARC AND A SECOND SOURCE

PRIORITY CLAIM AND CROSS-REFERENCE TO RELATED APPLICATIONS

This patent application is a continuation-in-part application of both U.S. patent application Ser. No. 12/949,736 filed on Nov. 18, 2010 and entitled "Method for Treating Liquids with Wave Energy from an Electrical Arc", now U.S. Pat. No. 8,110,100, and U.S. patent application Ser. No. 12/577,130 filed on Oct. 9, 2009 and entitled "Plasma Whirl Reactor Apparatus and Methods of Use.", now U.S. Pat. No. 8,324,523.

U.S. patent application Ser. No. 12/949,736 is a divisional application of U.S. patent application Ser. No. 11/784,326 filed on Apr. 5, 2007 and entitled "System, Method and Apparatus for Treating Fluids with Wave Energy from an Electrical Arc", now U.S. Pat. No. 7,857,972, which is: (a) a continuation-in-part application of U.S. patent application Ser. No. 10/935,786 filed on Sep. 7, 2004 and entitled "Treatment of Fluids with Wave Energy from a Carbon Arc", now U.S. Pat. No. 7,422,695, which is a non-provisional application of U.S. provisional patent application 60/500,445 filed on Sep. 5, 2003; (b) a non-provisional application of U.S. provisional patent application 60/789,670 filed on Apr. 5, 2006 and entitled "System, Method and Apparatus for Treating Liquids with Wave Energy from an Electrical Arc".

U.S. patent application Ser. No. 12/577,130 is a continuation patent application of U.S. patent application Ser. No. 10/196,466 filed on Jul. 15, 2002 and entitled "Plasma Whirl Reactor Apparatus and Methods of Use", now U.S. Pat. No. 7,622,693, which is a non-provisional patent application of U.S. provisional patent application 60/305,833 filed on Jul. 16, 2001.

This patent application is related to: (a) U.S. patent application Ser. No. 12/949,745 filed on Nov. 18, 2010 and entitled "System for Treating Fluids with Wave Energy from an Electrical Arc"; (b) U.S. Pat. No. 7,578,937; (c) U.S. Pat. No. 7,897,053; (d) U.S. Pat. No. 7,985,342; (e) U.S. patent application Ser. No. 11/784,327 filed on Apr. 5, 2007 and entitled "System, Method and Apparatus for Treating Liquids with Wave Energy from Plasma"; (f) U.S. patent application Ser. No. 12/166,408 filed on Jul. 2, 2009 and entitled "Treatment of Fluids with Wave Energy from a Carbon Arc"; and (g) U.S. patent application Ser. No. 12/506,037 filed on Jul. 20, 2009 and entitled "Treatment of Fluids with Wave Energy from a Carbon Arc".

All of the foregoing patents and patent applications are hereby incorporated by reference in their entirety.

FIELD OF THE INVENTION

The present invention relates generally to the field of treating substances, and more particularly, to a system, method and apparatus for treating substances with wave energy produced from an electrical arc and a second source.

BACKGROUND OF THE INVENTION

Without limiting the scope of the invention, its background is described in connection with treating substances in particular drinking water, wastewater, beverages, juices, milk, emulsions, ballast water, bilge water, cooling tower water, process water, mill water, raw sewage, crude oil, hydrocarbon streams, black liquor and any pumpable substance, as an example. During the past decade the need for alternatives to chlorination of drinking water and wastewater effluent has increased in dramatic fashion. This is primarily due to emerging pathogenic microorganisms that are resistant to many oxidants such as chlorine, as well as the problems associated with the byproducts formed by reacting chlorine with organics found in drinking water sources.

For example, many drinking water sources contain organic matter. When the organic matter is chlorinated the byproducts are a group of compounds referred to as trihalomethanes (THMs), some of which cause cancer. Consequently, this has led the US EPA to promulgate new disinfection regulations regarding both pathogenic microorganisms and the formation of THMs. Currently, there is an unmet demand for a simple and cost-effective alternative to supplement chlorination that can also be used for treating other water streams. For example, one such alternative disinfection system is the use of ultraviolet (UV) radiation to augment chlorination. Likewise, UV radiation can replace chlorination chambers in wastewater treatment plants, since the effluent must be dechlorinated which requires an additional chemical such as sulfur dioxide. Two other large volume streams that can be treated with UV radiation are ballast water from ships and combined sewer overflows (CSO).

Heretofore water treatment systems that incorporate UV radiation have been constructed of a lamp housed within a quartz sleeve. Examples of prior UV radiation systems include low pressure or medium pressure mercury arc lamps. One of the main problems with existing UV radiation systems that incorporate mercury arc lamps is that they fail to maximize the use of electricity. More particularly, by utilizing only the energy in the form of UV radiation converted from the electricity used in the overall electrical circuit—the lamp—is inefficient and requires higher doses of UV radiation than are necessary if more of the electrical energy in the electrical circuit could be utilized for pathogen inactivation or treatment of pollutants. For example, a typical UV lamp may convert only 30% to 40% of the electricity used in the lamp into UV radiation. In addition, these lamps contain mercury, which is a pollutant that can be transferred via the food chain.

In addition, any UV radiation system incorporating a "bulb" is prone to burn out. Furthermore, over time the glass or quartz envelope and the bulb become solarized due to the UV light. In addition, over time the quartz envelope that houses the lamp becomes dirty. The quartz tube must be removed and cleaned manually if it does not include a wiper system for in-situ cleaning of the tube. Consequently, the effectiveness of the UV radiation system to inactivate cryptosporidium is reduced over time as the lamp ages and the quartz sleeve or envelope becomes dirty.

Moreover, there is an emerging pathogen of concern, mycobacteria, that is resistant to chlorine and many biocides. Likewise, mycobacteria inactivation requires a higher dose of UV light than either Cryptosporidium and Giardi. In addition, low doses of UV light cannot be applied to meet sterilization or pasteurization guidelines as set forth by the US FDA, USDA and UPH. The terms disinfection and sterilization are clearly defined and differentiated by several regulator agencies.

Accordingly, there is a need for a wave energy water treatment system that is compact and portable, yet does not use mercury. In addition, there is a need for a wave energy water treatment system that is energy efficient, rugged, low maintenance and compact. Likewise, there is a need for a wave energy system that can also remove fine sediment or reduce turbidity in water. In addition, there is a need for a disinfection system that can also phase separate material of various densities from that of water, such as oil and grease, wood, leaves, and plastic bottles from water. Furthermore, there is a need for reducing organic matter in water.

SUMMARY OF THE INVENTION

The present invention provides a system, method and apparatus for treating substances with wave energy from an electrical arc that: (1) is compact and portable, yet does not use mercury; (2) is energy efficient, rugged, low maintenance and compact; (3) can also remove fine sediment or reduce turbidity in water; (4) can also phase separate material of various densities from that of water, such as oil and grease, wood, leaves, and plastic bottles from water; and/or (5) can reduce organic matter in water. The substance can be drinking water, wastewater, beverages, juices, milk, emulsions, ballast water, bilge water, cooling tower water, process water, mill water, raw sewage, crude oil, hydrocarbon streams, black liquor or any pumpable substance. The present invention can operate in remote areas of the world that can deliver various forms of wave energy to the water and contaminants, and not simply UV radiation, that would aid in decomposing organics and producing a potable water source, which is needed immediately throughout the world. In addition, the present invention can be operated without line power by using a wind turbine or photovoltaic cells, which allows for remote treatment of water and wastewater without the need of a generator or line power.

The present invention generates a whirlpool or cyclonic flow and one or more wave energies in the "eye" "plasma core" or "hollow gas core" of the whirlpool. The present invention treats the substances or fluids by first irradiating the fluid with a plasma arc centrally located within the gas core of the whirling fluid, then second forming a thin film with the fluid and irradiating the thin film fluid and third reflecting the wave energy in order to increase the dose of wave energy absorbed by the fluid or matter within the fluid. The present invention can also provide an advanced oxidation/reduction process (AORP) for treating fluids utilizing a semi-conductor catalyst. Likewise, the present invention includes a means for introducing charged nano metals and minerals as well as carbon for treating water. Additionally, the present invention includes a phase separation mechanism.

The present invention, which will be described in detail below, provides superior wave energy delivery to the substance to be treated, a superior method for stripping and destroying volatiles in-situ and a method for subjecting fluids, contaminants and pathogens to several forms of wave energy simultaneously. In addition, the present invention provides a mechanism for treating substances with several forms of wave energy, such as ultraviolet radiation, vacuum ultraviolet radiation, infrared radiation, visible light radiation, microwave radiation, infrared radiation, sonic energy, ultrasonic energy, electrolysis or a combination thereof. Additionally, the present invention provides a mechanism for generating an oxidant or free radicals in-situ. Furthermore, the present invention utilizes a unique approach for disinfecting and filtering water within the same system. Hence, by the present invention's novel wave energy method for treating substances by eliminating the lamp, and using a carbon arc in combination with a whirling fluid, a system can be designed to treat very low flow rates using a wind turbine or photovoltaic cells to recharge DC batteries, while scaling up to treat volumes of water currently unheard of by using very large DC power supplies and graphite rods, commonly found within the foundry industry—carbon arc furnaces.

Accordingly, the present invention to treats substances with several forms of wave energy at wavelengths, focus, intensity and residence times that is superior to prior methods. The present invention uses the conservation of angular momentum to first form a whirling fluid that increases in velocity, then expands outwardly to form a thin film upside down whirlpool or funnel, generally shaped in the form of an umbrella or parabolic reflector. The present invention also overcomes residence time and absorbance phenomena associated with photochemical reactions.

More specifically, the present invention provides an apparatus for treating a substance that includes: (a) a volute or cyclone head having an inlet and an outlet, (b) a throat having a first opening, a second opening and a central axis, wherein the first opening is connected to the outlet of the volute or cyclone head, (c) a parabolic reflector having a vertex, a focus and an opening at the vertex, wherein the opening is connected to the second opening of the throat such that the vertex and focus are axially aligned with the central axis and the focus is not located within the throat, (d) a first wave energy source comprising a first electrode within the volute or cyclone head that extends through the outlet into the first opening of the throat along the central axis of the throat, and a second electrode extending into the parabolic reflector proximate to the focus wherein the second electrode is spaced apart and axially aligned with first electrode, and (e) a second wave energy source disposed inside the throat, embedded within the throat or disposed around the throat. The substance is supplied to the inlet of the volute or cyclone head and is irradiated with one or more wave energies produced by the first and second wave energy sources.

In addition, the present invention provides an apparatus substantially as shown in FIG. 12A, 12B, 12C, 12D, 12E, 13A, 13B or 13C.

The present invention is described in detail below with reference to the accompanying drawings.

BRIEF DESCRIPTION OF THE DRAWINGS

The above and further advantages of the invention may be better understood by referring to the following description in conjunction with the accompanying drawings, in which:

FIGS. 12A-12E illustrate various embodiments of an Arc Whirl® having a straight throat and a second wave energy source in accordance with the present invention;

FIGS. 13A-13C illustrate various embodiments of an Arc Whirl® having a cone shaped throat and a second wave energy source in accordance with the present invention;

DETAILED DESCRIPTION OF THE INVENTION

Figure 1:
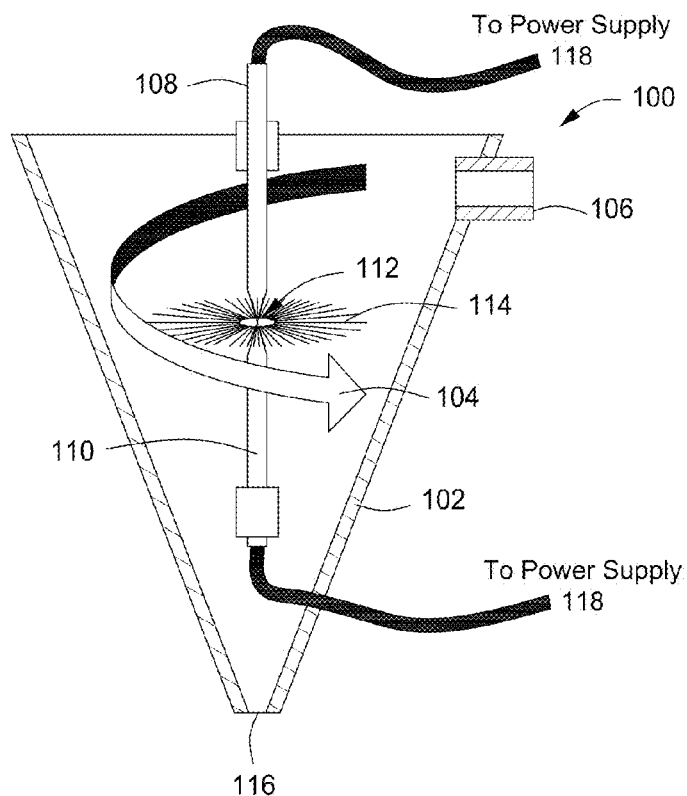
FIG. 1 illustrates an Arc Whirl® device in accordance with one embodiment of the present invention.

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. The discussion herein relates primarily to treating substances, solids and substance/solid mixtures, but it will be understood that the concepts of the present invention are applicable to treating any substance regardless of its form (e.g., a solid, a liquid, a gas or a mixture thereof).

The term "wave energy" is used herein to include radiation as well as wave energies transmitted by various mediums, and embraces electromagnetic waves or radiations; sonic, supersonic, and ultrasonic waves; and neutrons, protons, deuteron, and other corpuscular radiations. The term "electromagnetic waves" (also commonly referred to as electromagnetic radiation ("EMR")) includes, e.g., X-ray and gamma-ray, ultraviolet, infra red, and visible light rays, microwave, and both short electric and radio waves.

The present invention can be operated in many different modes for treating substances. A partial list of applications for treating matter range from IR heating to chemical conversion. The term "chemical conversion" as used herein includes the terms cracking, reforming, gasification, combustion, oxidation, reduction, etc. Simply put a chemical conversion with respect to the present invention means a "chemical reaction." Likewise the present invention allows for communition such as grinding, crushing, grating, granulating, milling, disintegration, attrition, trituration, pulverization, etc. In its broadest meaning, the term "comminution" as used herein will also mean atomization. In addition, in its broadest meaning the Plasma ArcWhirl® is a whirling fluid that allows for separating material based upon density. The terms vortex, cyclone, tornado, whirlpool, whirl, swirl, etc. are used interchangeably herein. These terms refer to a mass of fluid with a whirling or circular motion that tends to form a cavity or vacuum in the center of the circle and to draw toward this cavity or vacuum bodies subject to its action. In other words, the term "whirl, vortex, tornado or cyclone" as used in the present invention applies to a region within a body of fluid in which the fluid elements have an angular velocity or angular momentum.

The present invention provides a system, method and apparatus for treating matter with wave energy from an electrical arc and a second wave energy source that: (1) is compact and portable, yet does not use mercury; (2) is energy efficient, rugged, low maintenance and compact; (3) can also remove fine sediment or reduce turbidity in water; (4) can also phase separate material of various densities from that of water, such as oil and grease, wood, leaves, and plastic bottles from water; and/or (5) can reduce organic matter in water. The substance can be drinking water, wastewater, beverages, juices, milk, emulsions, ballast water, bilge water, cooling tower water, process water, mill water, raw sewage, crude oil, hydrocarbon streams, black liquor or any pumpable substance. The present invention can operate in remote areas of the world that can deliver various forms of wave energy to the water and contaminants, not simply UV radiation, and would aid in decomposing organics and produce potable water that is needed immediately throughout the world. In addition, the present invention can be operated without line powers and generators by using a wind turbine or photovoltaic cells, which allows for remote treatment of water and wastewater.

The present invention generates a whirlpool or cyclonic flow and one or more wave energies in the "eye" or "hollow gas core" of the whirlpool. The present invention treats the substances or fluids by first irradiating the fluid with a plasma arc centrally located within the gas core of the whirling fluid, then second forming a thin film with the fluid and irradiating the thin film fluid and third reflecting the wave energy in order to increase the dose of wave energy absorbed by the fluid or matter within the fluid. The present invention can also provide an advanced oxidation/reduction process (AORP) for treating fluids utilizing a semi-conductor catalyst. Likewise, the present invention includes a means for introducing charged nano metals and minerals as well as carbon for treating water. Additionally, the present invention includes a phase separation means.

The present invention, which will be described in detail below, provides superior wave energy delivery to the fluid to be treated, a superior method for stripping and destroying volatiles in-situ and a method for subjecting fluids, contaminants and pathogens to several forms of wave energy simultaneously. In addition, the present invention provides a mechanism for treating matter with several forms of wave energy, such as ultraviolet radiation, vacuum ultraviolet radiation, infrared radiation, visible light radiation, microwave radiation, infrared radiation, sonic energy, ultrasonic energy, electrolysis or a combination thereof. Additionally, the present invention provides a mechanism for generating an oxidant or free radicals in-situ. Furthermore, the present invention utilizes a unique approach for disinfecting and filtering water within the same system. Hence, by the present invention's novel wave energy method for treating fluids by eliminating the lamp, and using a carbon arc in combination with a whirling fluid. A system can be designed to treat very low flow rates using a wind turbine or photovoltaic cells to recharge DC batteries, while scaling up to treat volumes of water currently unheard of by using very large DC power supplies and graphite rods, commonly found within the foundry industry—carbon arc furnaces.

Accordingly, the present invention treats substances or fluids with several forms of wave energy at wavelengths, focus, intensity and residence times that is superior to prior methods. The present invention uses the conservation of angular momentum to first form a whirling fluid that increases in velocity, then expands outwardly to form a thin film upside down whirlpool or funnel, generally shaped in the form of an umbrella or parabolic reflector. The present invention also overcomes residence time and absorbance phenomena associated with photochemical reactions.

Prior art wave energy, in particular EMR, devices and methods, are designed for a given flow rate range. Simply put, the photochemical reactor has a known volume, and based upon the volume of the reactor the number of EMR sources which are needed to effect a reaction over a specified time period is calculated and commonly referred to as residence time (RT). Normally the EMR sources are continuous wave sources such as long linear low-pressure mercury arc lamps, medium pressure mercury lamps and short-arc HgXe lamps. However, high intensity flash lamps are being employed for substances that are somewhat opaque, such as juices. Since these lamps are rated in watts, then the joules/second emitted from the lamps can be multiplied by the RT to specify an effective dose applied to an area (watts/second/area) of the treated fluid.

For example, the amount of radiation necessary to deactivate bacteria is known. Thus, simply by working backwards from this known value, in combination with the average population density of the bacteria, the variable or number of EMR sources and size of the reactor may be easily calculated. However, problems arise when bacteria counts increase from the assumed average value. Either a second reactor must be installed or more lights must be added to the existing reactor.

The Beer-Lambert Law can be applied to clearly show that a long linear lamp placed inside a conduit would be an ineffective photochemical reactor. The Beer-Lambert Law and associated equation is significant to photochemical or wave energy reactor design. Although the following equation is straightforward, it is often misunderstood and incorrectly used.

$$A = \epsilon bc$$

Where A is absorbance (no units);
$\epsilon$ is the molar absorbtivity with units of L/mole/cm;
b is the path length of the sample (or photochemical reactor length); and
c is the concentration of the compounds in the solution with units of moles/liter.

Within this law, absorbance is directly proportional to the other parameters. The law indicates that the fraction of the radiation absorbed by each layer of the fluid is the same. The equation, "$A=\epsilon bc$" tells a photochemical reactor designer that absorbance depends on the total quantity of the absorbing compound in the radiation path through the photochemical reactor. Thus, if a designer refers to percent transmission (% T) an exponential curve can be generated comparing % T to pathlength. However, if absorbance is plotted against concentration, a straight line emerges. Thus, the linear relationship between concentration and absorbance is both simple and straightforward.

However, as omni-directional wave energy travels away from its source in a given vessel, in accordance with "$A=\epsilon bc$", the number of photons near the wall of the vessel has decreased, but the concentration of contaminants within the fluid is equal at any distance from the omni-directional lamp. Thus, if this reactor is designed for bacterial disinfection, the bacteria near the wave energy source receives a greater amount of energy than the bacteria near the wall of the vessel. As a result, bacteria kill is higher near the wave energy source and decreases by the square of the distance from the lamp.

Since this is an omni-directional lamp it follows the inverse square law, which states that the intensity of light observed from a source of constant intrinsic luminosity falls off in direct proportion to the square of the distance from the object. As an example, if 16 W/cm$^2$ is measured at a distance of 1 meter from a source, 4 W/cm$^2$ will be measured at 2 meters. The intensity can be similarly calculated at any other distance. The inverse square law is applicable to variations in intensity without regard to direction from the light source only in cases where the light source approximates a point source. However, the same principle is useful in understanding the decrease in intensity that occurs outward from a linear source, such as an elongate bulb, in a direction normal to the axis of the elongate source.

In the context of treating fluids with wave energy, another significant factor that has a significant effect on treatment efficacy is the distance that a given wave energy particle, such as a UV light photon will travel through a material. For example, UV light with a wavelength of 253.7 nm can penetrate water to a depth of over 24 inches, but a very thin sheet of aluminum foil will block UV light completely. Likewise, turbidity in water will partially block UV light. On the other hand, aluminum can be enhanced to reflect greater than 80% of UV light. Accordingly, all UV light treatment systems are subject to the disadvantages and obstacles related to absorbance, or penetration distance through the fluid being treated. Penetration distance is also referred to as path length. Because of these factors, it can be understood that increasing the reactor volume to increase fluid residence time does not affect or change path length, and does not necessarily improve treatment effectiveness.

With these factors in mind the present invention can be more readily understood and its novelty and significance more readily appreciated. The present invention overcomes the problems of diminishing intensity and of path length by exposing a thin layer of fluid to wave energy in close proximity to the energy source.

Referring now to FIG. 1, an Arc Whirl® device 100 in accordance with one embodiment of the present invention is illustrated. A vessel 102 capable of producing vortex flow as shown by arrow 104, such as a funnel or cyclone, is use to produce a thin film of substance flowing on the vessel wall around a gas core or a plasma core. The shape of the vessel 102 and the position and/or type of inlet 106 is not limited to those shown in FIG. 1. Instead any combination of shapes or orientations can be used as long as the vortex flow 104 is created. The central gas core, which is devoid of the substance, is created when the substance, such as water, is introduced into the vessel 102 via inlet 106 to create the vortex flow 104. Carbon arc rods 108 and 110 are located within the central core. A carbon arc 112 is created by extending a filament between the carbon arc rods 108 and 110 to form a dead short when the electrodes 108 and 110 are connected to a power supply 118. Alternatively, the carbon arc 112 can be created by moving carbon arc rods 108 and 100 together to form a dead short when the electrodes 108 and 110 are connected to the power supply 118 and then separating them to "draw" the carbon arc 112. The carbon arc 112 extending between the proximate tips of the carbon rods 108 and 110 produces one or more wave energies 114, such as deep UV light, to treat the substance. The substance is discharged from the vessel 102 via an exit or outlet 116.

Graphite rods are manufactured in sizes ranging from welding rod diameters of 0.125 inches to diameters of 6 feet for carbon rods commonly used in electric arc furnaces. Since World War II vintage carbon arc searchlights are widely available, the present invention can easily be constructed from that supply of surplus searchlights. Any DC power source 118 can be used to create a carbon arc from graphite rods. A simple solar powered battery can be used as the DC source 118 for the carbon arc, which enables the use of inexpensive disinfection systems for treating, e.g., drinking water, in remote areas as well as third world countries. The present invention also provides a mechanism for a compact, but extremely powerful, wave energy system for disinfecting high flow rate streams such as ship ballast water and large municipal drinking water and wastewater plant effluent. In contrast to typical UV light systems, the present invention is not limited in size due to lamp construction, nor in performance due to solarization of a quartz lamp envelope. In addition, maximum transfer of wave energy occurs in the present invention, since the present invention uses an open arc. Furthermore, the present invention makes use of all the forms of wave energy produced from the carbon arc and not simply just the UV light irradiated from the plasma or tip of the hot carbon rod.

A vessel 102 that is well suited for creating a vortex for use in the present invention for disinfecting and sterilizing using induced cavitations is disclosed in U.S. Pat. No. 6,019,947 issued to Kucherov on Feb. 1, 2000 and entitled, "Method and Apparatus for Sterilization of a Continuous Liquid Flow," which hereby incorporated into the present description in its entirety. The improvement of the present invention over the teaching of the Kucherov '947 patent includes, without limitation, the factor that the carbon arc of the present invention adds at least two additional forms of wave energy for sterilization—UV light and free radicals or electrons.

Figure 2:
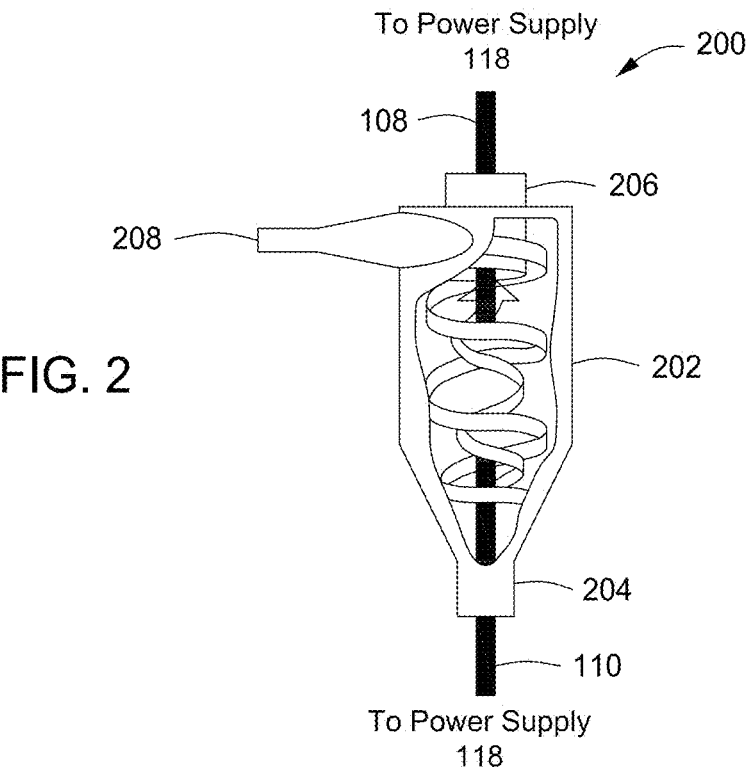
FIG. 2 illustrates an Arc Whirl® cyclone separator in accordance with a second embodiment of the present invention.

Now referring to FIG. 2, an Arc Whirl® cyclone separator 200 in accordance with a second embodiment of the present invention is illustrated. A cyclone separator 202 can easily be modified for the present invention. The carbon rods 108 and 110 are inserted in the underflow 204 and overflow 206 of the cyclone separator 200. The substance is introduced into the cyclone separator 202 via inlet 208. The carbon arc is formed between the rods 108 and 110 within the core of the cyclone separator 202 when the carbon rods 108 and 110 are connected to power supply 118.

Figure 3:
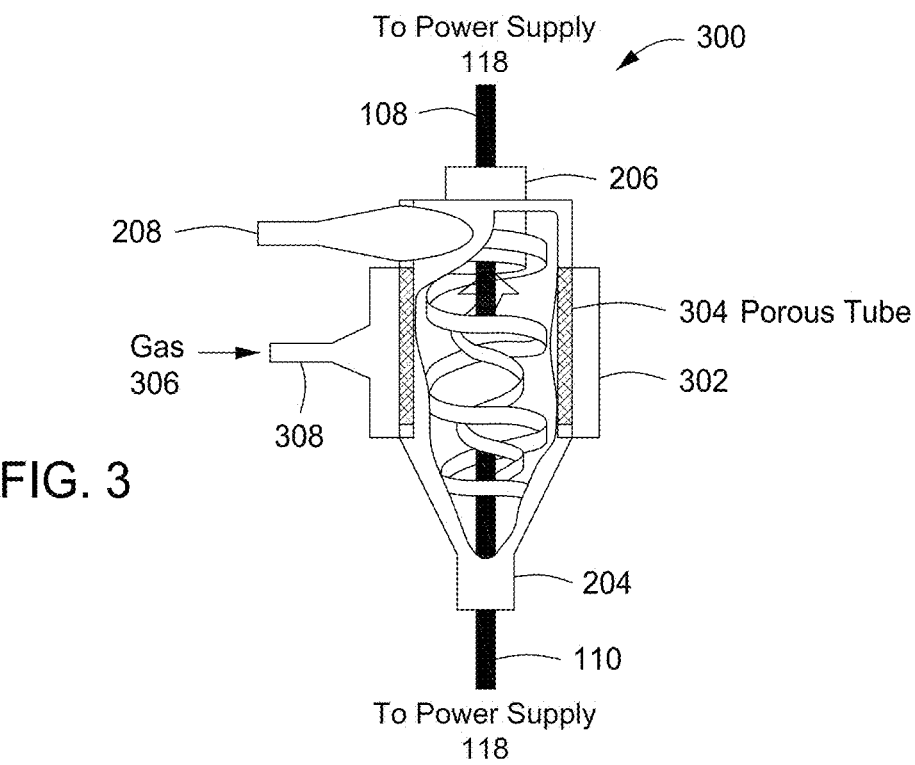
FIG. 3 illustrates an Arc Whirl® gas-sparged hydrocyclone in accordance with a third embodiment of the present invention.

Referring now to FIG. 3, an Arc Whirl® gas-sparged hydrocyclone 300 in accordance with a third embodiment of the present invention is illustrated. A hydrocyclone with a porous wall 304, referred to as an air-sparged hydrocyclone, can be used as the vessel 302 for the present invention. The carbon rods 108 and 110 are inserted in the underflow 204 and overflow 206 of the gas-sparged hydrocyclone 300. The substance is introduced into the vessel 302 via inlet 208. The carbon arc is formed between the rods 108 and 110 within the core of the vessel 302 when the rods 108 and 110 are connected to power supply 118. Air or gas 306 is introduced into the vessel 302 via gas inlet 308 connected to the porous wall 304. The air/gas sparged hydrocyclone 300 aids in stripping volatiles from the fluid and induce cavitation, in addition to the creation of a thin fluid film. Air-sparged hydrocyclones 300 can strip hydroscopic molecules, such as alcohols, from water. Further, the air boundary layer between the sparging surface and the fluid reduces friction, thus allowing the fluid to achieve and maintain higher velocities at lower pump pressures. This has a highly desirable effect if the fluid achieves a velocity sufficient to cavitate. Cavitation is the formation of bubbles in a substance, followed by a subsequent collapse of the bubble. Cavitation can be viewed as a form of wave energy, because the cavitation creates sonic waves and sonic energy is a form of wave energy.

Moreover, cavitation can "kill" pathogens, produce chemical reactions and mix the fluid thoroughly. In addition, the thoroughly mixed fluid travels through a gas-sparged hydrocyclone 300 in a corkscrew or vortex path, but as a very thin layer. This thin layer results in a very short penetration distance that must be achieved by the wave energy to achieve effective treatment through the full thickness of substance. Consequently, the available path length for the wave energy in the treated fluid ceases to be a limitation on treatment effectiveness, and maximum absorption of wave energy will be achieved. It should be understood that wave energy path length and penetration distance are not related to or necessarily affected by the length of the vessel.

When the velocity of the substance in a thin film air-sparged hydrocyclone 300 is sufficiently to produce cavitation in the substance, the high level of wave energy from cavitation, in combination with the wave energy generated by the unconfined carbon arc in accordance with the present invention, can dramatically enhance the performance of wave energy based substance treatment. The addition of the carbon arc system described above to any gas sparger system will also provide dramatic treatment improvements from the expanded range of wave energies generated by the unconfined carbon arc.

Note that the use of a gas-sparged hydrocyclone as the vessel for the present invention is not simply for the cavitation and stripping effects. The REVEX™ MTU, for example, produces a very thin fluid film. In combination with the thin fluid layer, the fluid flows in a spiral path around and along the longitudinal axis of the porous tube component of that apparatus. This produces a dramatic increase in substance residence time within the reactor in comparison to linear flow through a reactor of the same length, and allows the use of a compact reactor with a much higher effective treatment capacity than is possible with reactors of the prior art.

Figure 4:
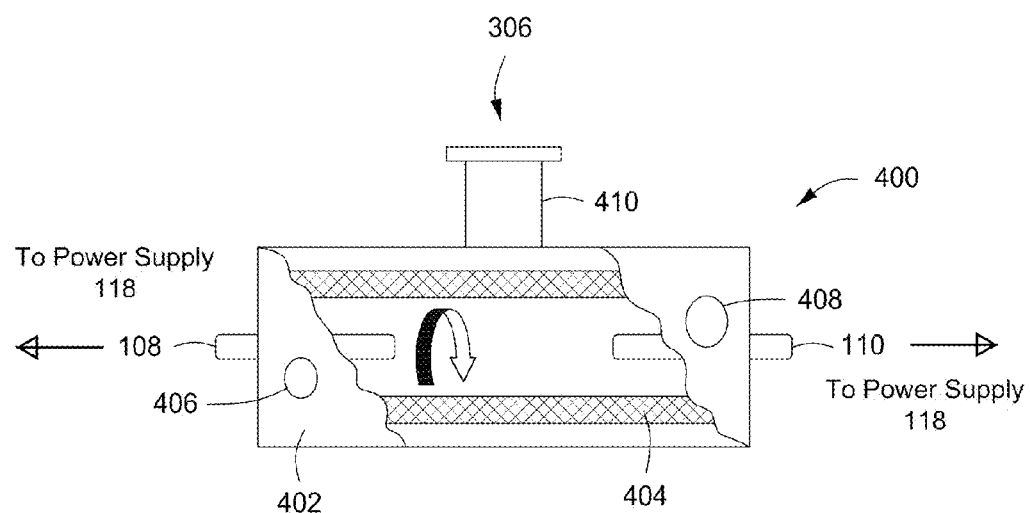
FIG. 4 illustrates an Arc Whirl® gas-sparged pipe with tangential flow in accordance with a fourth embodiment of the present invention.

Now referring to FIG. 4, an Arc Whirl® gas-sparged pipe with tangential flow 400 in accordance with a fourth embodiment of the present invention is illustrated. A pipe 402 with porous wall 404 can also be used for the present invention. The carbon rods 108 and 110 are inserted in each end of the pipe 402. The substance is introduced into the pipe 402 via inlet 406 and allowed to exit via outlet 408. The carbon arc is formed between the rods 108 and 110 within the core of the vessel 402 when rods 108 and 110 are connected to power supply 118. Air or gas 306 is introduced into the vessel 402 via gas inlet 410.

Figure 5:
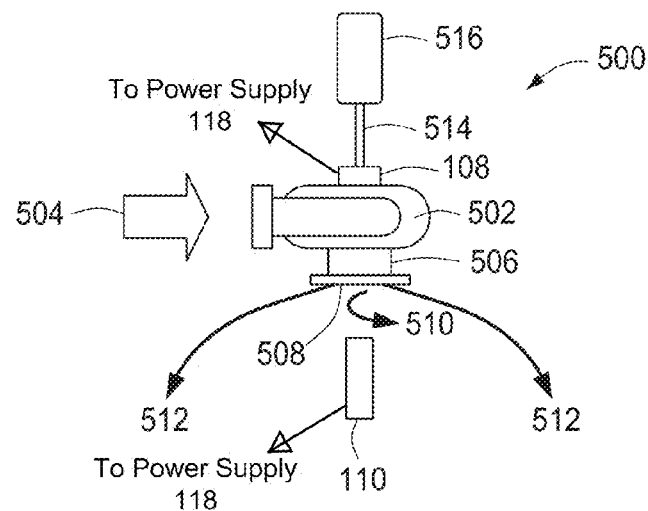
FIG. 5 illustrates an Arc Whirl® volute in accordance with fifth embodiment of the present invention.
Figure 6:
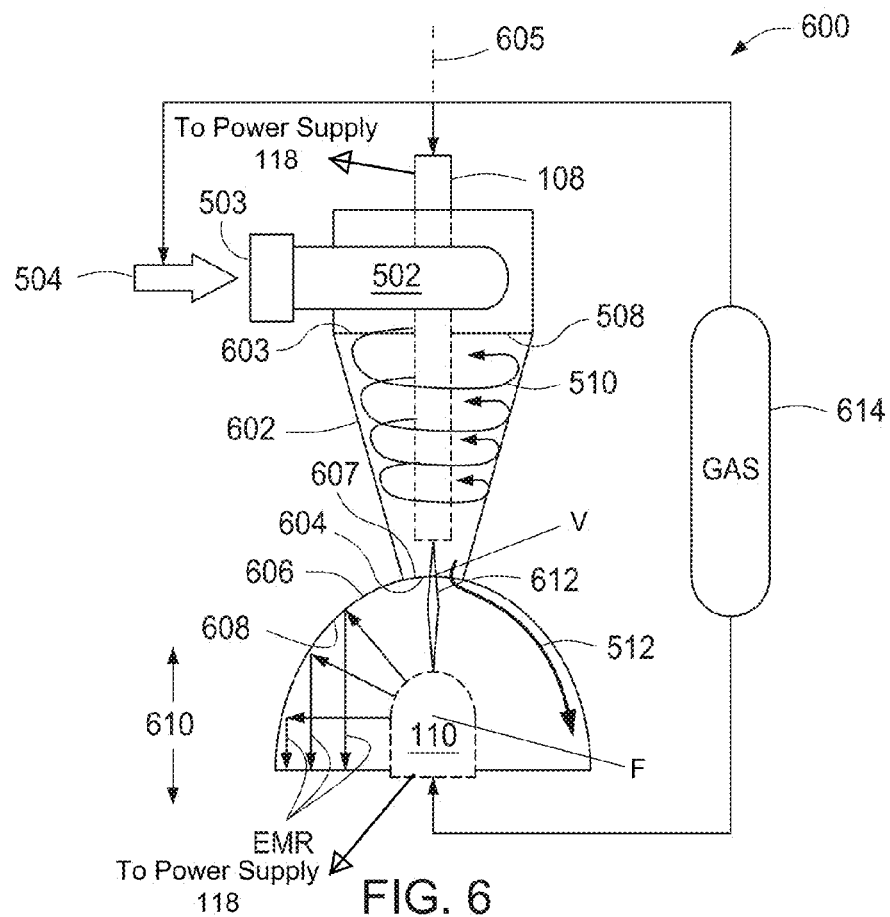
FIG. 6 illustrates an Arc Whirl® hydrocyclone reflector in accordance with a sixth embodiment of the present invention.

Referring now to FIG. 5, an Arc Whirl® Volute 500 in accordance with fifth embodiment of the present invention is illustrated. A pump volute or hydrocyclone head 502 is utilized to produce angular momentum. When a substance, such as water, is introduced into the hydrocyclone as shown by arrow 504 the substance flows in a circle about a central axis forming a whirlpool or whirl flow and generating angular momentum. Hence, the term whirl herein means or is similar to vortex, swirl, cyclone, tornado, hurricane, typhoon or generally any flow having angular momentum. In applying the method of the present invention, quite simply electrodes such as carbon or graphite rods 108 and 110 are located along the central core or axis of the angular momentum generator—the volute 502. One electrode 108 is placed within the volute 502 while the other 110 is located outside of a throat 506. When referring to a pump, the throat 506 is actually the pump's suction inlet. In this example, the throat 506 is straight, but the throat can be cone shaped (throat 602) as shown in FIG. 6. When in operation water flows into the volute 502 via arrow 504 and forms whirl flow with an air core if open to atmosphere. The whirlpool enters into the throat 506 and the water must increase in velocity due to the conservation of angular momentum. As soon as the whirlpool exits the throat 506 at an exit point 508 the water continues to whirl as shown by arrow 510 but immediately expands outwardly as shown by arrows 512. The whirling water takes on a thin film umbrella or thin film upside down funnel shape with a very large air core. The unique shape or profile of the whirl method of the present invention gives rise to an entirely new method for treating substances. Since a low pressure gas core is formed along the central axis, then an arc can be struck and maintained within the central gas core and within the umbrella or upside down funnel. In order to strike an arc and convert the gas core to an arc plasma core, one of the electrodes 108 can be connected to a pushrod 514 that is connected to an actuator 516. The actuator 516 moves the electrode 108 until it touches electrode 110. When electrodes 108 and 110 touch, a dead short forms when the electrodes 108 and 110 are connected to a power supply 118. Next, electrode 108 is retracted thus forcing electrons to flow through the gas core and converting the gas core to an ionized gas typically referred to as a plasma. In lieu of moving the electrode 108, the pushrod 514 can move and touch the electrode 110. The pushrod 514 acts as a stinger to pull the arc from one electrode 110 to the other electrode 108.

An inert gas such as argon, helium, nitrogen, xeon or neon may be used in order to reduce oxidation of the electrodes as well as change the EMR spectrum of the plasma. Oxygen may be added to produce ozone and atomic oxygen. Of course any gas can be added and ionized including steam and hydrogen. Once again, the electrodes may be constructed of any electrically conductive material and not just carbon.

Now referring to FIG. 6, an Arc Whirl® Hydrocyclone Reflector 600 in accordance with a sixth embodiment of the present invention is illustrated. The novelty of the present invention lies within the power or wave energy generated by the carbon arc and the plasma 612 in combination with the unique shape of the whirling substance. The throat 602 can be straight as shown in FIG. 5 (throat 506) or cone shaped, such as a concentric reducer as shown in FIG. 6. When the water expands outwardly 512 at exit point 604 as previously stated the water takes the shape of a parabolic upside down funnel. The shape is almost identical to many common reflectors used throughout the lighting and optics industry.

Now when the water pressure and flow rate are increased prior to entering the Arc Whirl®, the umbrella shape will transition to more of a cone shape rather than an umbrella or parabolic shape. This of course does not affect the present invention. By adding a reflector 606 to the exit 604, electromagnetic radiation (EMR) emitted from the white hot carbon electrode 110 can be reflected to form a parallel beam as shown by EMR arrows. Reflector 606 may have a coating 608 to increase reflectivity or create a desired chemical reaction. Moreover a gas 614 can be introduced to create a desired chemical reaction or reduce/eliminate consumption or oxidation of the electrodes. Either electrode 108 or 110 can be the anode. Typically, the anode produces more EMR than the cathode. Thus, in order to take advantage and maximize the use of wave energy, both electrodes may move in the directions as shown by arrow 610 in order to place the electrodes in the most effective treatment zones for treating a particular substance, microorganism or contaminant.

More specifically, the Arc Whirl® Hydrocyclone Reflector 600 includes a pump volute or hydrocyclone head 502, a throat 602, a parabolic reflector 606, and a wave energy source having a first electrode 108 and a second electrode 110 connected to power supply 118. The pump volute or hydrocyclone head 502 has an inlet 503 and an outlet 508. The throat 602 has a first opening 603, a second opening 604 and a central axis 605 wherein the first opening 603 is connected to the outlet 508 of the pump volute or hydrocyclone head 502. The parabolic reflector 606 has a vertex V, a focus F and an opening 607 at the vertex V, wherein the opening 607 is connected to the second opening 604 of the throat 602 such that the vertex V and focus F are axially aligned with the central axis 605 and the focus F is not located within the throat 602. The first electrode 108 is disposed within the pump volute or hydrocyclone head 502 that extends through the outlet 508 into the first opening 603 of the throat 602 along the central axis 605 of the throat 602. The second electrode 110 extends into the parabolic reflector 606 proximate to the focus F wherein the second electrode 110 that is spaced apart and axially aligned with first electrode 108. The substance 504 enters through the inlet 503 of the pump volute or hydrocyclone head 502 and exits through the opening 607 at the vertex of the parabolic reflector 606.

Figure 7:
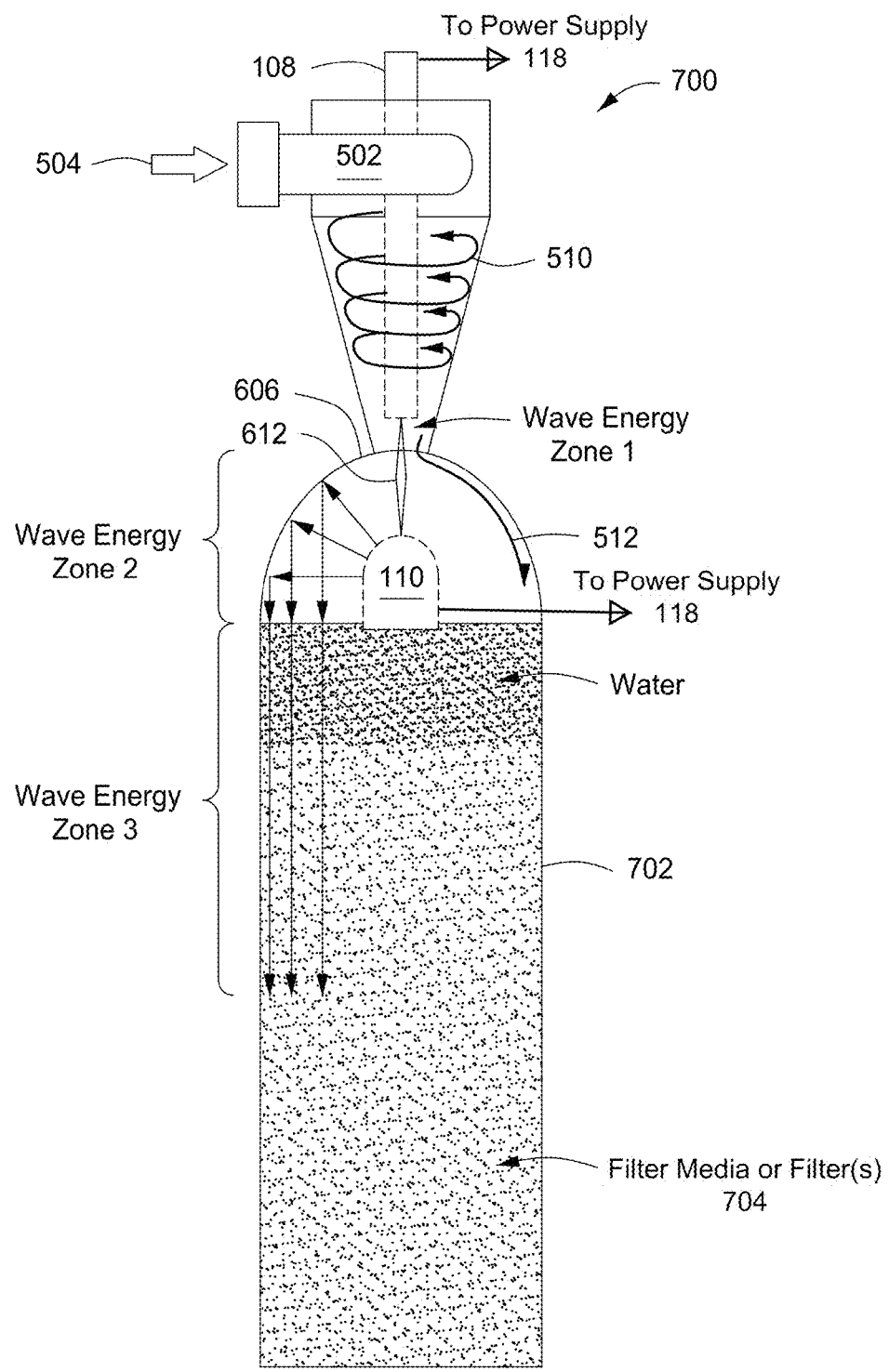
FIG. 7 illustrates an Arc Whirl® hydrocyclone reflector conduit in accordance with a seventh embodiment of the present invention.

Referring now to FIG. 7, an Arc Whirl® Hydrocyclone Reflector Conduit 700 in accordance with a seventh embodiment of the present invention is illustrated. The hydrocyclone 502 and reflector 606 (collectively 600 as shown in FIG. 6) are installed on top of a tank 702. The parabolic or elliptical reflector 606 can be utilized to irradiate the water in the tank 702 and increase the residence time or dose. The reflector 606 may include a coating 608, such as a UV enhancing material or a semi-conductor catalyst (e.g., $TiO_2$). This embodiment of the present invention 700 gives rise to several Wave Energy Zones. A Wave Energy Zone 1 is formed by the plasma 612. Plasma emits both EMR and sonic energy. The EMR emitted from the plasma 612 is based upon the gas as well as any substances or solids that may become trapped and ionized by the plasma. Likewise, plasmas contain ionized gases. The ionized gases which consist of electrons and cations may enter into the water and aid in treating the water. Thus, due to the water being in close proximity to the plasma 612 the water may be treated with various forms of wave energy. In addition, if oxygen is present both atomic oxygen and ozone may be formed. Both are highly reactive oxidants which can be used for treating water for disinfection as well as oxidation of organics, metals and minerals.

A carbon arc produces vacuum UV (VUV). Consequently, as previously stated VUV photons have a sufficient amount of energy to cleave water molecules and form highly reactive radicals such as hydroxyl radicals. In addition, VUV photons have a sufficient amount of energy to cleave carbon-carbon bonds in hydrocarbons. A carbon arc also produces copious amounts of both near and far infrared (IR) radiation. This will further enhance disinfection as well as well as aiding in treating organic compounds because organics absorb IR and vibrate electrons. Not being bound by theory, in addition to UV light and sonic energy the IR may catalyst the destruction of organics and pathogens within the water.

Next, the water enters a second Wave Energy Zone 2. Once again, the water or substance is treated by several forms of wave energy. First, the thin film umbrella or cone shaped water funnel must pass thru the EMR in Wave Energy Zone 2 then again through the EMR reflected by reflector 606 in Wave Energy Zone 3. Now, what is truly unique and unobvious is that if the position of electrode 110 is within the water, and the water is conductive, then the water will be treated by another form of wave energy—electrolysis. This gives rise to treating heavy metals such as selium found in uranium mills wastewater effluent. The metals may be plated unto the electrode 110 if operated as the cathode.

The tank 702 may consist simply of a very long pipe. The benefits of irradiating down the longitudinal axis of a pipe are discussed in U.S. Pat. No. 5,832,361 which is incorporated by reference in its entirety. Likewise, the tank or pipe 702 forms a Wave Energy Zone 3 in which the EMR reflected by reflector 606 passes through the water (or treated substance) and filter media or filters 704. It is in this zone that residence time can be dramatically increased by simply increasing the diameter of the tank 702 with an appropriate reflector or increasing the length or depth of the conduit 702.

In addition a filter media or one or more filters 704 may be added to the tank 702. This allows for a stand alone water treatment system that disinfects and removes turbidity which can be used in remote areas of the world. A prototype similar to FIG. 7 was constructed using 5 twelve volt DC batteries operated in series. A one inch arc was maintained using 60 volts and 20 amps to produce about a one kW UV radiation system which completely illuminated the plastic tank 702. The batteries were recharged with a multi-charger designed to charge batteries in series. Of course it will be understood that the batteries could be recharged with a green energy source such as a wind turbine, photovoltaic cell or hydroturbine. Also, the present invention gives rise to a highly mobile and portable emergency response water treatment system for the military, municipalities and emergency responders. The Arc Whirl® can be attached to the battery cell of any of the new hybrid vehicles. Note that the Arc Whirl® Hydrocyclone Reflector Conduit 700 is not limited to just treating water. Other substances, including but not limited to liquids and fluids, can be treated with the Arc Whirl® Hydrocyclone Reflector Conduit 700.

As illustrated in FIGS. 5 and 6 any hydrocyclone, cyclone head or volute 502 can easily be modified for the present invention by means of the following method. By attaching a reflector 606 to the underflow of the hydrocyclone 502 this allows for a novel method for treating substances with wave energy. As previously explained EMR can be reflected by various means known in the art. However, the apex valve of the hydrocyclone must be removed in order to form an umbrella shape. In addition, the insertion of the carbon rod 108 will substantially plug the overflow. The reason for removing the apex valve is part of the novel method for forming an umbrella shaped upside down water funnel.

While tank testing a hydrocyclone, the apex valve was removed from the underflow of a standard hydrocyclone. The hydrocyclone overflow discharge valve was shut for the test. When water was flowed through the hydrocyclone, upon exiting through the bottom or underflow of the hydrocyclone, the water fanned out and formed a very thin umbrella shape and maintained an air core along the entire central axis of the hydrocyclone. This was completely unexpected because prior to this test a straight piece of tubing with the same diameter of the bottom of the cone was tested and resulted in a twisted rope discharge.

What is not obvious and completely unexpected is a unique method and apparatus for treating small volumes as well as extremely large volumes of substances. By introducing an inert gas, such as argon, into the system a gas bubble core will be formed and maintained within the hydrocyclone and reflector. Since the argon is less dense then water it will remain in the upper section of the system even when the system is not in operation. When in operation, the argon will seek the center and form a gas core. When an arc is struck between the electrodes 108 and 110 the argon will ionize and form the whirling plasma 612 core. There are several primary reasons for using argon. First, argon is inert and does not affect or react with water. Second, the argon shields the carbon electrodes thus increasing the life expectancy of the electrodes. Also, argon is easy to ionize and is an ideal plasma gas.

As previously described in reference to FIG. 5, one of the electrodes 108 in FIGS. 6 and 7 can be connected to a pushrod 514 that is connected to an actuator 516 in order to strike an arc and create plasma core 612. The pushrod 514 and actuator 516 are not shown in FIGS. 6 and 7 in order to simply the drawings. The actuator 516 moves the electrode 108 until it touches electrode 110. When electrodes 108 and 110 touch, a dead short forms when the electrodes 108 and 110 are connected to a power supply 118. Next, electrode 108 is retracted thus forcing electrons to flow through the gas core and converting the gas core to an ionized gas typically referred to as a plasma. In lieu of moving the electrode 108, the pushrod 514 can move and touch the electrode 110. The pushrod 514 acts as a stinger to pull the arc from one electrode 110 to the other electrode 108.

Figure 8:
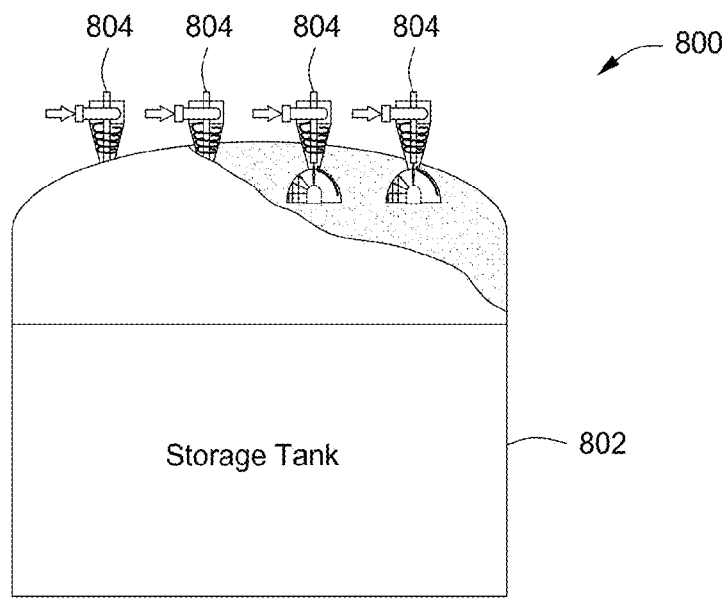
FIG. 8 illustrates multiple Arc Whirls® in tank in accordance with an eighth embodiment of the present invention.

Now referring to FIG. 8, Multiple Arc Whirls® in Tank 800 in accordance with an eighth embodiment of the present invention is illustrated. There is virtually no limit to the size of tank, container or vessel 802, the Arc Whirl® can be adapted to in addition to the flow rate. For example, 5 megawatt DC power supplies are available from HDR Ametek. Likewise, graphite electrodes are available in sizes up to 6 feet in diameter. Thus, as shown in FIG. 8 extremely large tanks can be treated with multiple Arc Whirls® as described in reference to FIGS. 5, 6, 7, 12A, 12B, 12C, 12D, 12E, 13A, 13B and 13C.

Figure 9:
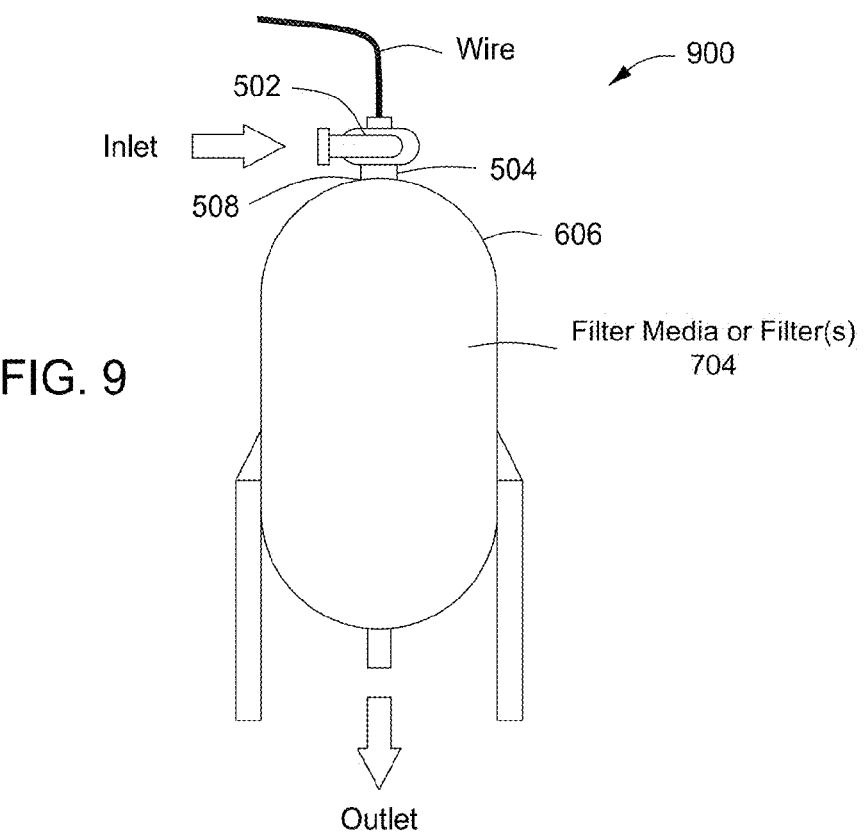
FIG. 9 illustrates an Arc Whirl® with sand filter in accordance with a ninth embodiment of the present invention.

Referring now to FIG. 9, an Arc Whirl® with a Filter 900 in accordance with a ninth embodiment of the present invention is illustrated. This embodiment can be a retrofit of current filter media or filter(s) 704, such as sand filters, to once again produce a stand alone substance treatment system using Arc Whirl® devices as previously described in reference to FIGS. 5, 6 and 7. Thus, this rapid retrofit does not require any tank modifications. In addition, the Arc Whirl® filter retrofit is quite inexpensive when compared to traditional UV radiation systems.

For example, the total costs for constructing the one kW Arc Whirl® was about $3,000 US. The least expensive one kW UV radiation system on the market today retails for about $26,000. It consists of 26 lamps in a vessel. Thus, from both a capital expense cost as well as operating costs the present invention's Arc Whirl® is far superior. Simply put, in remote areas of the world where sunshine or wind is available, the electrical operating costs can be reduced to nothing. Likewise, the size and weight of the one kW system as well as the current 100 KW model can fit into the trunk of a small car.

A 4 inch 100 kW Arc Whirl® was constructed and tested with paint booth water at an automobile plant. The paint booth water was black, opaque, had an extremely obnoxious odor and had an extremely high bacteria count. The paint booth water was treated with the Arc Whirl® in a first and second pass. The paint booth water changed colors to a transparent yellow tint and the water was odor free. Lab tests revealed a 99.99% bacteria kill.

Figure 10:
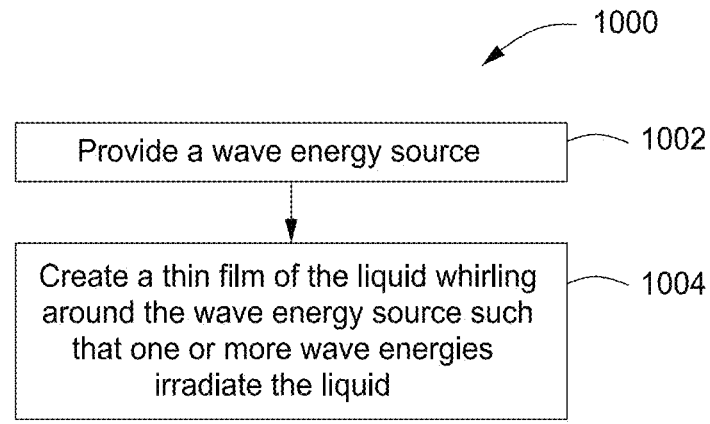
FIG. 10 is a flow chart of a method of treating a substance in accordance with the present invention.

Now referring to FIG. 10, a flow chart of a method 1000 of treating a substance in accordance with the present invention is shown. A wave energy source, such as the Arc Whirl® device as previously described in reference to FIGS. 5, 6 and 7, is provided in block 1002 and a thin film of the substance whirling around the wave energy source is created such that one or more wave energies irradiate the substance in block 1004. The one or more wave energies may include an ultraviolet radiation, a vacuum ultraviolet radiation, an infrared radiation, visible light radiation, microwave radiation, infrared radiation, sonic energy, an ultrasonic energy, an electrolysis or a combination thereof.

Figure 11:
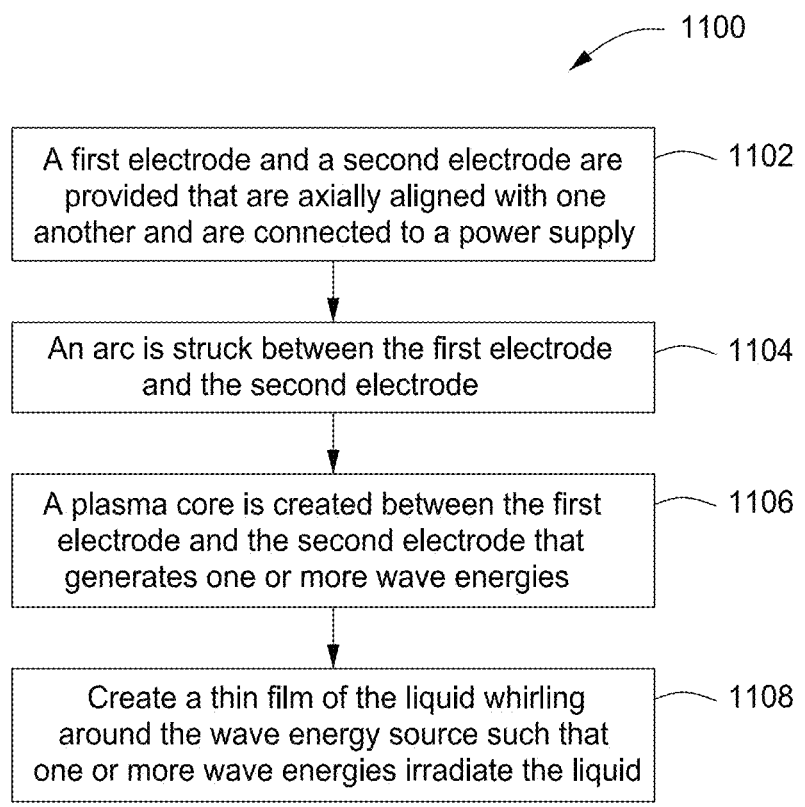
FIG. 11 is a flow chart of another method of treating a substance in accordance with the present invention.

Referring now to FIG. 11, a flow chart of another method 1100 of treating a substance in accordance with the present invention is shown. A first electrode 108 and a second electrode 110 are provided that are axially aligned with one another and connected to a power supply 118 in block 1102. An arc is struck between the first electrode 108 and the second electrode 110 in block 1104. A plasma core 612 is created between the first electrode 108 and the second electrode 110 that generates one or more wave energies in block 1106 and a thin film of the substance whirling around the wave energy source 612 is created such that one or more wave energies irradiate the substance in block 1108.

Enhancing Wave Energy Zone 1

Returning now to FIGS. 5, 6, 7, 12A-E and 13A-13C, Wave Energy Zone 1 can be dramatically enhanced with an additional wave energy source that directly or indirectly couples to the plasma core 612 and one or more of the electrodes 108 or 110 depending on the location of the second wave energy source. The Arc Whirl® of FIGS. 5, 6 and 7 can be improved as shown in FIGS. 12A-12E and FIGS. 13A-13C by adding a second wave energy source to the Arc Whirl®. The second wave energy source can be: (a) a radio frequency coil or winding 1202 disposed inside the throat 506 (FIG. 12D), embedded within the throat 506 (FIG. 12C), or disposed around the throat 506 (FIG. 12A) or throat 602 (FIG. 13A); (b) a waveguide that surrounds the throat (FIG. 12B) or throat 602 (FIG. 13B) and a microwave source coupled to the waveguide; (c) one more plasma torches connected tangentially to the throat 506 (FIG. 12E) or throat 602 (FIG. 13C) or (d) a combination or other wave energy source presently known or developed in the future. The second energy source can be added to entire throat 506 or 602, or only a portion of the throat 506 or 602. Moreover, the second energy source can be extended or added to the reflector 606 in a similar manner. The EMR is transmitted through an EMR permeable (i.e., transparent or semi-transparent to the EMR) portion of the throat 506 or 602 to inductively couple the RF radiation to the plasma core 612 and any electrode (e.g., 108) within the EMR produced by the second wave energy source. Induction heating with radio frequency is common throughout manufacturing industries and inductively coupled plasma torches are widely used for solid, liquid and gas analysis via ICP mass spectrometry. Thus, further elaboration with regards to induction coupling is not necessary to practice the current invention as disclosed. The one or more plasma torches in FIG. 12E or 13C are directly coupled to the plasma core 612.

Figure 12A:
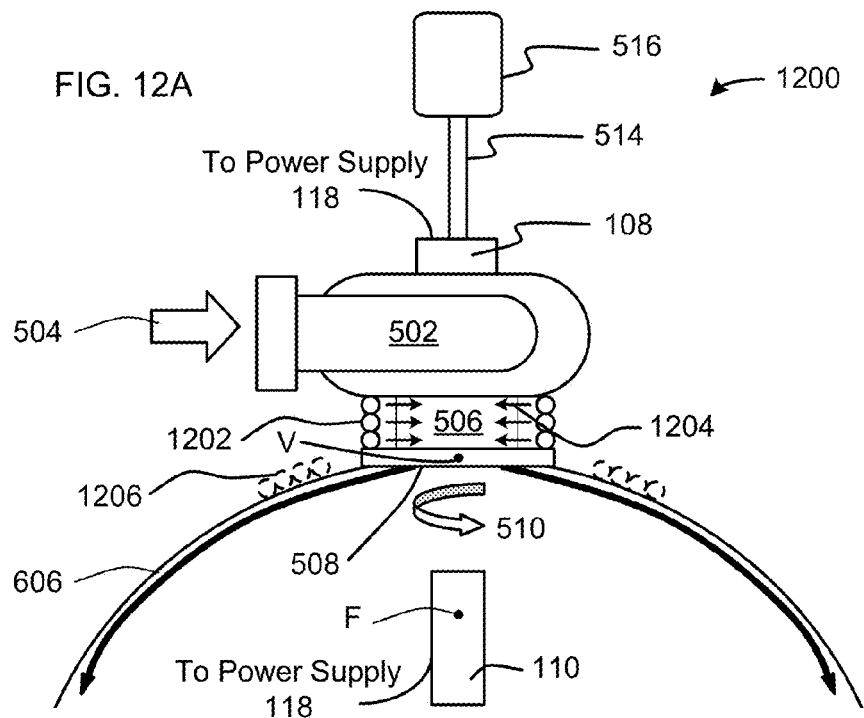
Figure 13A:
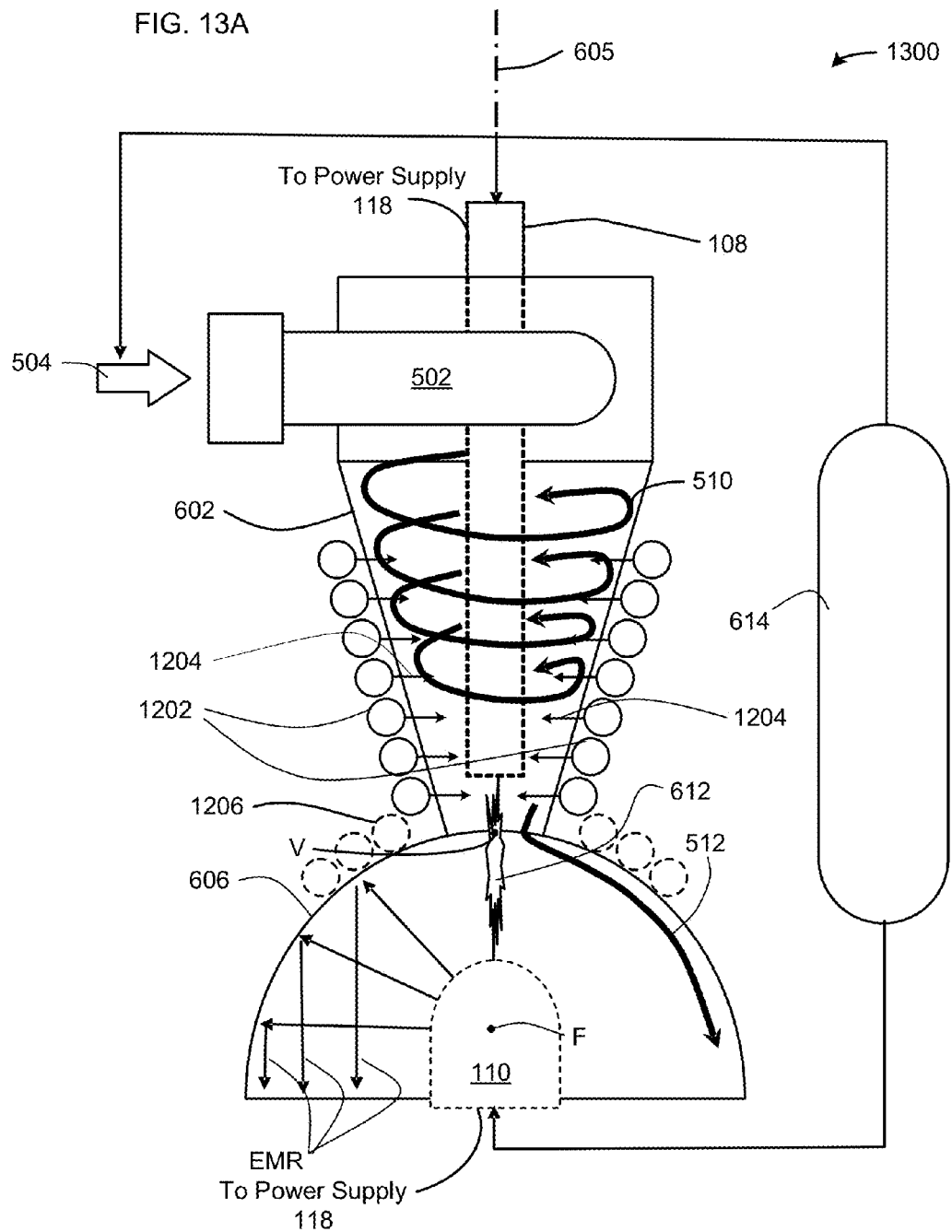
Figure 13C:
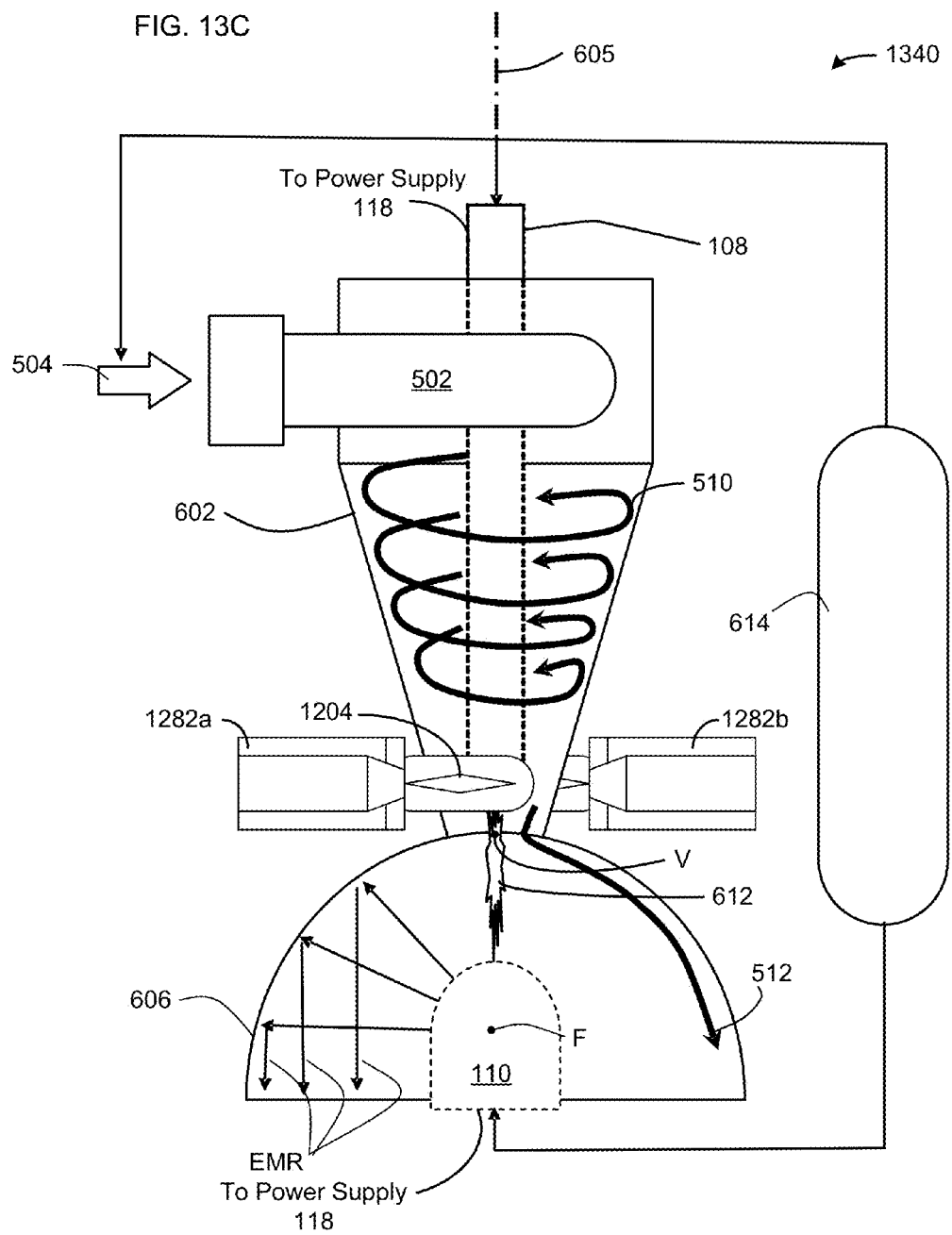

Referring now to FIG. 12A an Arc Whirl® Volute 1200 in accordance with tenth embodiment of the present invention is illustrated. A volute or cyclone head 502 is utilized to produce angular momentum. When a substance (e.g., a liquid, a gas or a mixture thereof) is introduced into the cyclone as shown by arrow 504, the substance flows in a circle about a central axis forming a whirlpool or whirl flow and generating angular momentum. In applying the method of the present invention, quite simply electrodes such as carbon or graphite rods 108 and 110 are located along the central core or axis of the angular momentum generator—the volute 502. One electrode 108 is placed within the volute 502 while the other 110 is located outside of a throat 506. When referring to a pump, the throat 506 is actually the pump's suction inlet. When in operation, the substance flows into the volute 502 via arrow 504 and forms whirl flow with an air core if open to atmosphere. The whirlpool enters into the throat 506 and the substance must increase in velocity due to the conservation of angular momentum. As soon as the whirlpool exits the throat 506 at an exit point 508 the substance continues to whirl as shown by arrow 510 but immediately expands outwardly as shown by arrows 512. The whirling substance takes on a thin film umbrella or thin film upside down funnel shape with a very large air core. The thickness of the film will depend on the density and consistency of the substance. The unique shape or profile of the whirl method of the present invention gives rise to an entirely new method for treating substances. Since a low pressure gas core is formed along the central axis, then an arc can be struck and maintained within the central gas core and within the umbrella or upside down funnel. In order to strike an arc and convert the gas core to an arc plasma core, one of the electrodes 108 can be connected to a pushrod 514 that is connected to an actuator 516. The actuator 516 moves the electrode 108 until it touches electrode 110. When electrodes 108 and 110 touch, a dead short forms when the electrodes are connected to a power supply. Next, electrode 108 is retracted thus forcing electrons to flow through the gas core and converting the gas core to an ionized gas typically referred to as a plasma. In lieu of moving the electrode 108, the pushrod 514 can move and touch the electrode 110. The pushrod 514 acts as a stinger to pull the arc from one electrode 110 to the other electrode 108. The plasma can be dramatically enhanced by adding a second wave energy source. A radio frequency ("RF") coil or winding 1202 is attached around the throat 506 to emit wave energy 1204. The throat 506 may be constructed of a material that transmits, reflects and/or absorbs RF radiation. If the goal is to inductively couple to the electrode 108 and the plasma, then the throat 506 would be constructed of a RF permeable material (i.e., transparent or semi-transparent to the RF radiation). On the other hand, if the goal is to emit infrared ("IR") radiation into the throat region, then the throat 506 material would be constructed of a material that absorbs RF radiation and has a high IR emisitivity. Both Graphite and Silicon Carbide, SiC, are suitable materials. Any material which will absorb RF and can emit IR is a suitable throat 506 material for practicing the current invention. In addition, an additional RF coil or winding 1206 can be attached around a portion of the parabolic reflector 606 that is made of a similar RF permeable material as described above.

For example, the Arc Whirl® was tested with a throat 506 made of graphite surrounded by an Ambrel RF Coil 507 with an RF power supply manufactured by Ambrel of Scottsville, N.Y. Compressed air was flowed into the volute 502. The graphite throat 506 was heated to red hot. The RF power supply parameters were 26.3 kW, 400 volts with 406.71 seconds run time at a frequency of 11.1 KHz.

Likewise, the Arc Whirl® was tested with a throat 506 made of silicon carbide, a SiC Spiro Core manufactured by Spin Works of Erie, Pa. An Ambrel Ecoheat 45 RF power supply was attached to a RF coil 507. The RF coil 507 surrounded the SiC throat 506. Internal temperatures were recorded and the maximum internal throat 506 wall temperature was 4,094° F. This was completely unexpected because the manufacturer, Spin Works, has rated its SiC Spiro Core's at a maximum use temperature of 2,300° F. At 4,094 F the SiC throat 506 could only be viewed with a #5 welder's shield due to the intense IR irradiating from its surface.

Consequently, by installing an RF absorbing throat 506 and irradiating the throat 506 with wave energy selected from the RF spectrum, the RF can be absorbed and emitted as IR to enhance and improve the effectiveness of Wave Energy Zone 1 for treating substances. A unique and truly unobvious method can be applied for treating substances of various densities. It is well known that a cyclone separator is a density separator. Less dense matter seeks the center core, while more dense matter reports to or near the wall of the cyclone. In this unique and unobvious mode of operation matter of various densities can be treated with different forms of wave energy. For example, larger particles and more dense matter will be treated with IR emitted from the throat 506, while less dense matter will be treated with wave energy produced from the plasma arc.

Now, it will be fully understood that the throat 506 may be constructed of a material transparent to RF. Consequently, the matter or contaminants within a substance, such as water, may absorb the RF EMR, or the graphite electrode 108 can be used as a susceptor for absorbing RF and emitting IR. In addition, it is well known that RF will couple to an arc and/or plasma. This is commonly referred to as an Inductively Coupled Plasma ("ICP"). Thus, Wave Energy Zone 1 can be enhanced by inductively coupling to the wave energy from the plasma arc or induction heating of the graphite electrode 108.

Figure 12B:
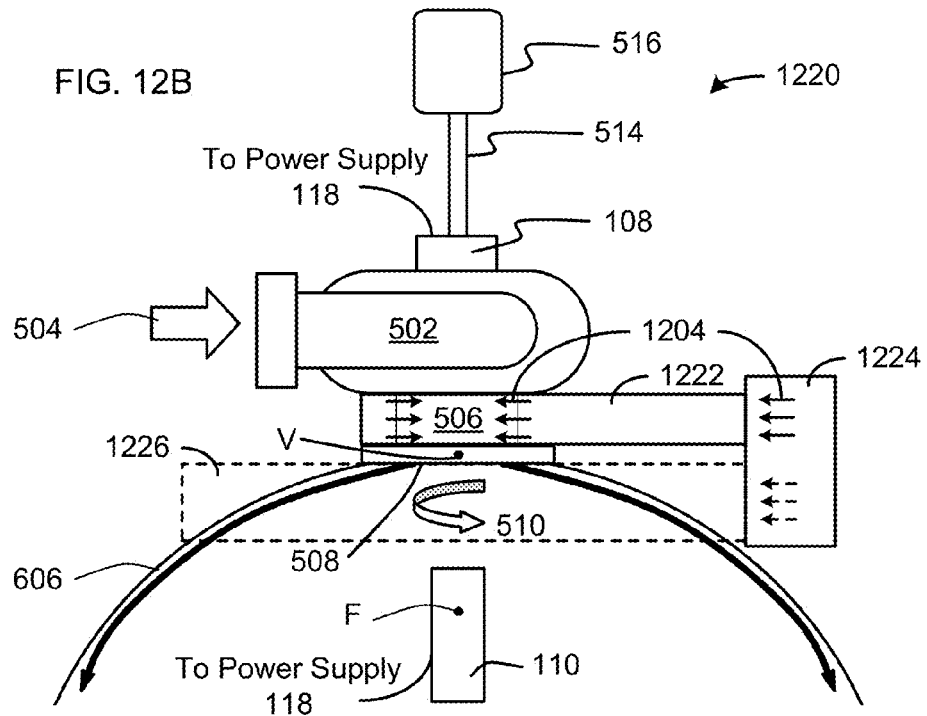
Figure 12E:
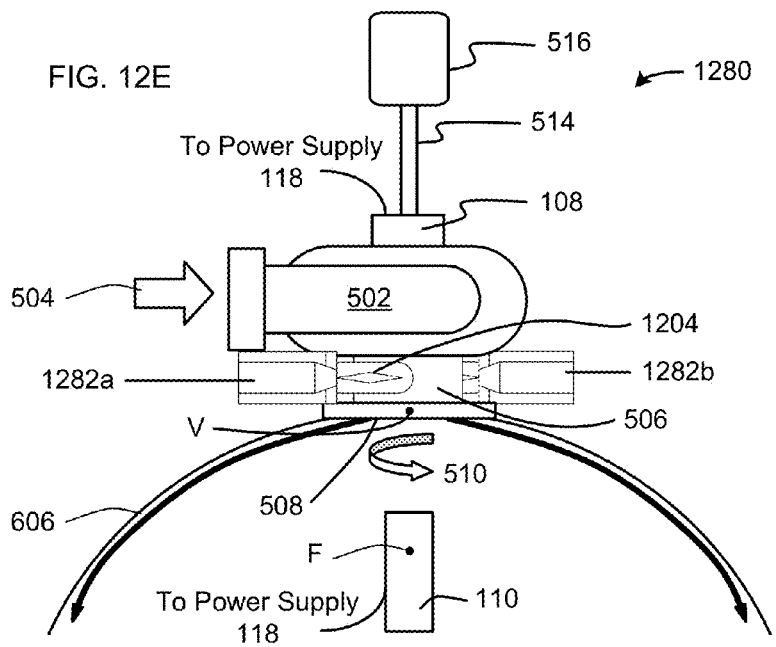

Now referring to FIG. 12B, which is an eleventh embodiment 1220 of the present invention illustrates an EMR permeable throat 506 that is surround by a microwave waveguide 1222. EMR 1204 within the microwave spectrum is produced by a microwave source 1224 and is transmitted within the waveguide 1222 to the EMR permeable throat 506. It is well known and well understood that many types of matter can be treated with microwaves. Likewise, microwaves, which fall into the RF spectrum will also couple to a plasma and to hot matter. And old saying with microwaves is that the hotter it gets the quicker it gets hot. This happens when a sharp metal object is placed within a microwave oven. The metal will heat up in lieu of reflecting the microwaves and may reach a temperature of thermionic emission. Thermionic emission is when a substance is heated to a temperature that an electron is ejected from the material causing a spark or plasma. A method, process and apparatus has been disclosed for enhancing the effectiveness of Wave Energy Zone 1 with EMR covering the entire RF spectrum from microwaves to radio frequency waves. In addition, an additional waveguide 1226 can be attached around a portion of the parabolic reflector 606 that is made of a similar EMR permeable material as described above.

Referring now to FIG. 12C, a twelfth embodiment 1240 of the present invention as shown that dramatically enhances the treatment effectiveness of matter with hot gas bubbles and EMR. The throat 506 is constructed of a porous tube 1242, as previously describe in reference to FIGS. 3 (304) and 4 (404). An RF coil or winding 1202 is used for non-contact heating of the porous tube 1242 via induction heating. Any fluid can be flowed into the throat inlet 1244. In other words, the throat 506 includes a porous inner portion 1242 and a throat inlet 1244 connected to the porous inner portion. The fluid will increase in temperature as it traverses through the porous tube wall 1242. The hot microscopic sized bubbles will traverse from the internal wall of the porous tube 1242 into the center of the whirling substance 510. This will aid in stripping contaminants from the fluid and into the plasma arc. In addition, if a substance is used, then the RF coil or winding 1202 can be solid and thus does not need to be tubing in order to cool the RF coil or winding 1202. Water is an ideal fluid. Likewise, hydrogen peroxide, $H_2O_2$, is an ideal fluid. When $H_2O_2$ decomposes it forms water and oxygen. Thus, this unique and unobvious method, process and apparatus for heating fluids with an inductively heated porous material gives rise to an entirely new type of heater. For example, if steam and a combustible gas, such as natural gas, are flowed into throat inlet 1244, and the porous SiC Tube is heated to temperatures in excess of 3,000° F., the gas mixture will be reformed into syngas consisting of hydrogen and carbon monoxide. The water flowing in a whirlpool as shown by 510 will scrub the syngas mixture. The syngas will then enter into the plasma to enhance the spectrum and effectiveness of Wave Energy Zone 1.

On the other hand, Porous Tube 1242 Throat 506 can be manufactured of an EMR transparent material such as alumina, plastic, glass and/or fiberglass in order for the RF energy to enter into Wave Energy Zone 1. This would allow for the system to operate as a combined Cyclone Gas Sparger Inductively Coupled Plasma Torch.

Now referring to FIG. 12D, a thirteenth embodiment 1260 of the present invention is disclosed by installing an RF coil or winding 1202 inside the throat 506.

Referring now to FIG. 12E, a fourteenth embodiment 1280 of the present invention is disclosed by installing one or more plasma torches (e.g., 1282a and 1282b) tangentially within the throat 560 to inject a plasma into Wave Energy Zone 1 in the same whirling direction as the substance being treated. What is unique and unobvious about this approach is that the torches 1282a and 1282b can simply be an electrode with the opposite polarity of electrode 108 or 110. Thus, when dead shorted against its opposite polarity electrode it will form a plasma arc between the electrodes. This will dramatically enhance Wave Energy Zone 1. However, plasma torches commonly available such as ESAB's PT19 torch can be used to enhance the effectiveness of Wave Energy Zone 1. A detailed explanation of plasma torches aligned tangentially within a cyclone is described disclosed in U.S. patent application Ser. No. 12/577,130 filed on Oct. 9, 2009 and entitled "Plasma Whirl Reactor Apparatus and Methods of Use" and applications related thereto which are hereby incorporated by reference. In the present invention, one torch will suffice since the bulk substance will keep the plasma off of the throat 602.

FIGS. 13A, 13B and 13C show additional embodiments 1300, 1320 and 1340 of the present invention wherein a cone shaped throat 602 is used instead of a straight throat 506. The details and operation of devices 1300, 1320 and 1340 are basically the same as described in reference to FIGS. 12A, 12B and 12E. Note that a cone shaped throat 602 can also be used in place of the straight throat 506 in FIGS. 12C and 12D. Porous cones on the bottom of cyclone hoppers are known to prevent bridging and sticking of material. With respect to FIG. 13B, a thin whirling fluid such as brine, frac flowback from oil and gas well fracturing, produced water from oil and gas wells or any fluid that rapidly absorbs microwaves can be quickly treated with this method. For example, any offgases formed and/or stripped will rapidly flow to the plasma arc center due to being less dense. Consequently not only is the water treated, but also dissolved gases such as hydrogen sulfide can be treated with the Plasma ArcWhirl®. With respect to FIG. 13C, the gas from tank 614 may be used as the plasma gas for torch 1282a and 1282b.

The present invention overcomes two major problems with Inductively Coupled Plasma—igniting and sustaining the plasma. By centering the arc with electrodes and then coupling to the plasma arc and electrodes with a second wave energy source, such as RF and/or microwaves a smaller DC power supply can be utilized. Likewise, this allows for smaller electrodes. However, it is the arc between the electrodes that allows for growing and forming a very dense inductively couple plasma that is extremely difficult to extinguish.

Likewise, this configuration solves a third major problem with the use of plasma—plasma confinement. Plasma confinement is necessary in order to keep the plasma from reaching the plasma facing material also referred to in the present invention as the throat. The whirling fluid is always more dense then the plasma. Likewise, cold gases are more dense then hot gases. Thus, the hot gases will always seek the center plasma arc void.

Figure 14:
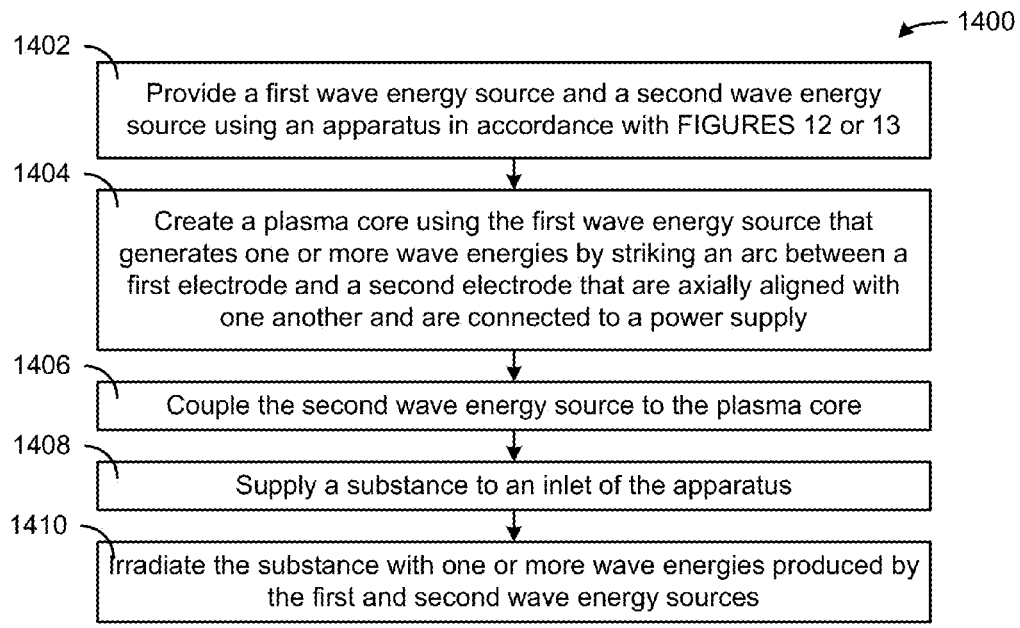
FIG. 14 is a flow chart of another method of treating a substance in accordance with the present invention.

Now referring to FIG. 14, a method 1400 for treating a substance in accordance with the present invention is shown. A first and second wave energy source is provided using an apparatus as described in reference to FIGS. 12 and 13 in block 1402. The apparatus includes: (a) a volute or cyclone head having an inlet and an outlet, (b) a throat having a first opening, a second opening and a central axis, wherein the first opening is connected to the outlet of the volute or cyclone head, (c) a parabolic reflector having a vertex, a focus and an opening at the vertex, wherein the opening is connected to the second opening of the throat such that the vertex and focus are axially aligned with the central axis and the focus is not located within the throat, (d) a first wave energy source comprising a first electrode within the volute or cyclone head that extends through the outlet into the first opening of the throat along the central axis of the throat, and a second electrode extending into the parabolic reflector proximate to the focus wherein the second electrode is spaced apart and axially aligned with first electrode, and (e) a second wave energy source disposed inside the throat, embedded within the throat or disposed around the throat. A plasma core is created using the first wave energy source that generates one or more wave energies by striking an arc between a first electrode and a second electrode that are axially aligned with one another and are connected to a power supply in block 1404. The second wave energy source is then coupled to the plasma core in block 1406. The second wave energy source can also be coupled to the first electrode and/or the second electrode. Moreover, the coupling can be direct or indirect. A substance is supplied to an inlet of the apparatus in block 1408 and the substance is irradiated with one or more wave energies produced by the first and second wave energy sources in block 1410.

Figure 15:
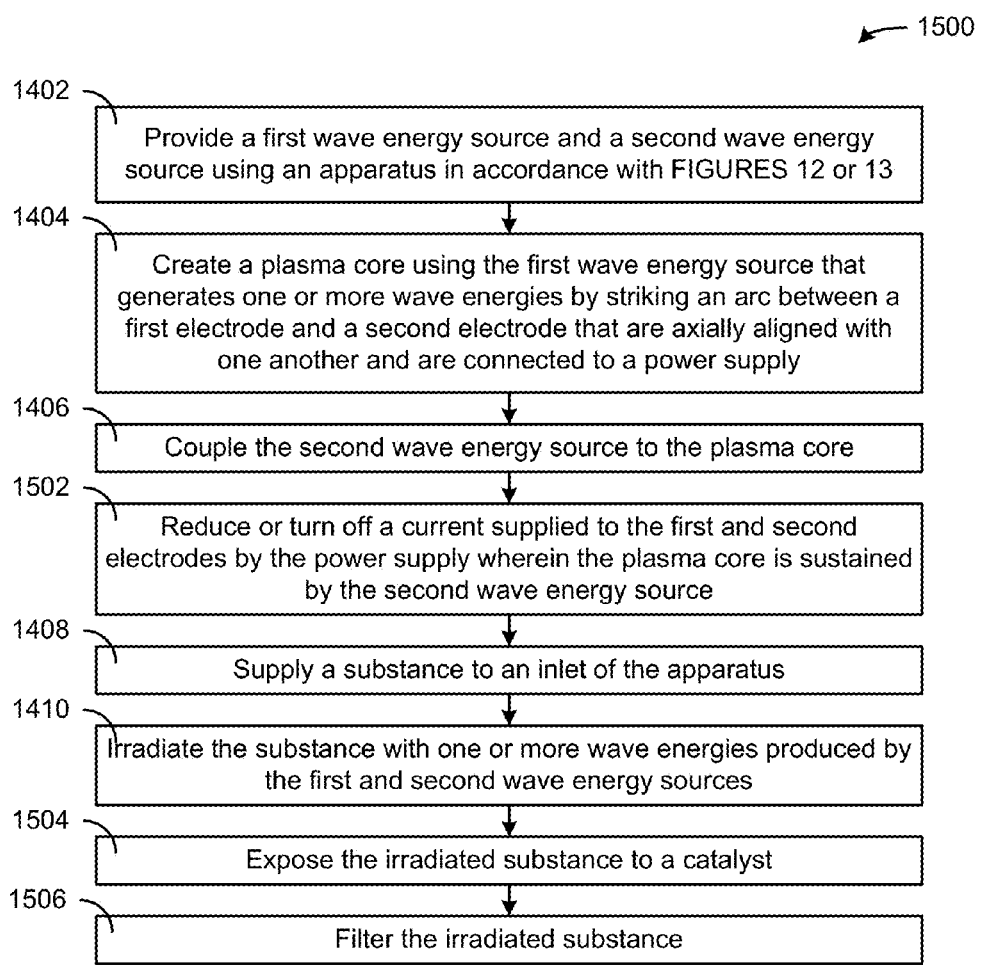
FIG. 15 is a flow chart of another method of treating a substance in accordance with the present invention.

Referring now to FIG. 15, a method 1500 for treating a substance in accordance with the present invention is shown. A first and second wave energy source is provided using an apparatus as described in reference to FIGS. 12 and 13 in block 1402. The apparatus includes: (a) a volute or cyclone head having an inlet and an outlet, (b) a throat having a first opening, a second opening and a central axis, wherein the first opening is connected to the outlet of the volute or cyclone head, (c) a parabolic reflector having a vertex, a focus and an opening at the vertex, wherein the opening is connected to the second opening of the throat such that the vertex and focus are axially aligned with the central axis and the focus is not located within the throat, (d) a first wave energy source comprising a first electrode within the volute or cyclone head that extends through the outlet into the first opening of the throat along the central axis of the throat, and a second electrode extending into the parabolic reflector proximate to the focus wherein the second electrode is spaced apart and axially aligned with first electrode, and (e) a second wave energy source disposed inside the throat, embedded within the throat or disposed around the throat. A plasma core is created using the first wave energy source that generates one or more wave energies by striking an arc between a first electrode and a second electrode that are axially aligned with one another and are connected to a power supply in block 1404. The second wave energy source is then coupled to the plasma core in block 1406. The second wave energy source can also be coupled to the first electrode and/or the second electrode. Moreover, the coupling can be direct or indirect. A current supplied to the first and second electrodes by the power supply is reduced or turned off in block 1502 wherein the plasma core is sustained by the second wave energy source. A substance is supplied to an inlet of the apparatus in block 1408 and the substance is irradiated with one or more wave energies produced by the first and second wave energy sources in block 1410. The irradiated substance is exposed to a catalyst in block 1504 and filtered in block 1506.

The following non-limiting examples of treatment applications in which the present invention may be used are provided to demonstrate the range of utility of the invention as well as the novelty of the inventive concept. These examples also illustrate the extremely urgent need for such an invention in the context of health and environmental safety issues.

Mycobacteria in Metal Working Fluids

Environmental opportunistic mycobacteria, have been implicated in outbreaks of a variety of respiratory problems in a wide variety of settings. One common feature of the outbreaks has been exposure to aerosols. Aerosols are generated from metalworking fluids during machining and grinding operations as well as from other sources such as indoor swimming pools, hot tubs, and water-damaged buildings. In the industrial setting, an estimated 1.2 million workers in the United States are exposed to aerosols generated by metal grinding, and the financial and social impacts of respiratory problems experienced by these workers are substantial. Mycobacteria are readily aerosolized and are resistant to disinfection. In the vast majority of outbreaks of respiratory problems attributed to aerosolized mycobacteria, the water sources of the aerosols had been disinfected. In fact, it is believed that conventional disinfection may select for the predominance and growth of mycobacteria.

The present invention provides the ability to subject fluids such as metalworking fluids to a plurality of wave energy sources, and accordingly shows great promise for effective elimination and control of mycobacteria and other biological contaminants in those fluids. Though mycobacteria can survive chemical disinfection, it is believed that the bacterial will not survive exposure to the combination of UV radiation and free electrons from the carbon arc of the present invention, especially with the further combination of sonic wave energy from cavitation effects. Elimination or reduction of respiratory problems in the work place associated with metal working fluids will have significant financial benefits in affected industries, as well as significant social benefits from the reduction of those health problems.

Poultry Chiller Water

Statistically, each person in the United States consumes 44 kg (96 lb) of poultry meat annually. Poultry accounts for about 36% of meat consumption, second only to beef in the American diet. The wholesomeness of poultry products has a profound impact on public safety and health. The U.S. poultry industry produced 20 billion pounds of chicken and 6 billion pounds of turkey each year. Almost all poultry products are produced in "ready-to-cook" forms from automated plants of multimillion bird capacity. In these plants, birds are slaughtered, defeathered, eviscerated, rinsed, chilled, and packed. Chilling carcasses rapidly to below 40 F is crucial for minimizing microbial growth and preserving carcass quality. It is accomplished by immersing rinsed carcasses in icy water in one, two, or three long tanks, the chillers. Many processors use chlorine to control microbial populations in poultry chiller water (PCW). Presently, chlorine and its hydration products, hypochlorous acid and hypochlorite, are the only disinfectants permitted by the regulatory agencies for use in PCW (U.S. Department of Agriculture, 1993).

Poultry chiller water is known for its high content of organic matter. Chlorination of PCW results in the formation of trihalomethanes, primarily chloroform, and other mutagenic compounds that have yet to be identified. Although the health impact of these potentially deleterious compounds has not been established, providing alternative methods for disinfecting PCW is highly desirable. Further, the recycling of chiller water may offer a way to prevent environmental pollution while helping to conserve valuable water resources.

It is believed that treatment of PCW with the high intensity UV radiation and free electrons generated by the carbon arc of the present invention, especially when the PCW is controlled to be exposed to those wave energies in a thin film in close proximity to the energy source will overcome the prior art disadvantages of intensity and path length and result in safe and effective disinfection of the PCW. The treatment effectiveness can be enhanced within the scope of the present invention by further combining the sonic wave energy associated with cavitation with the carbon arc wave energies by conducting the treatment in, e.g., the REVEX™ MTU apparatus.

Marine Ballast Water

Invasive aquatic species are one of the four greatest threats to the world's oceans, and can cause extremely severe environmental, economic and public health impacts. The introduction of invasive marine species into new environments by ships' ballast water has been identified as one of the four greatest threats to the world's oceans. Shipping moves over 80% of the world's commodities and transfers approximately 3 to 5 billion tons of ballast water internationally each year. A similar volume may also be transferred domestically within countries and regions each year. Ballast water is absolutely essential to the safe and efficient operation of modem shipping, providing balance and stability to un-laden ships. However, it may also pose a serious ecological, economic and health threat.

Reballasting at sea, as recommended by the IMO guidelines, currently provides the best-available measure to reduce the risk of transfer of harmful aquatic organisms, but is subject to serious ship-safety limits. Even when it can be fully implemented, this technique is less than 100% effective in removing organisms from ballast water. Some parties even suggest that reballasting at sea may itself contribute to the wider dispersal of harmful species, and that island states located 'down-stream' of mid-ocean reballasting areas may be at particular risk from this practice. It is therefore extremely important that alternative, effective ballast water management and/or treatment methods are developed as soon as possible, to replace reballasting at sea.

MTBE in Drinking Water

MTBE, a gasoline additive, has contaminated many aquifers. Due to its high solubility it is extremely difficult to remove from water. However, when a carbon arc is incorporated in the central core of, preferably, the REVEX™ MTU, it is believed that the combination of cavitation energy with UV light energy and free electrons from the carbon arc will have a synergistic effect for the removal and/or decomposition of MTBE without the necessity of removing it from the water. Without being bound by theory, it is believed that oxidants such as free radicals, hydrogen peroxide and ozone will form from cavitation and from the contact of air with the carbon arc plasma. As a result, the MTBE will be oxidized to carbon dioxide and water.

Pathogens Such as Anthrax and Legionella in Drinking Water and/or Air

The synergistic affect of cavitation, UV light, and insitu generated oxidants produced by the apparatus of the present invention will have a deleterious affect on pathogens such as anthrax and legionella. The present invention can be used in a dual approach by scrubbing air to remove pathogens and then recirculating the substance for a pathogen kill.

Paint Booth VOCs

Typically, a downdraft waterfall scrubber is used to scrub VOCs from air exiting from a paint point. As a result, the water is contaminated with VOCs. Without being bound by theory it is believed that the use of, preferably, the REVEX™ MTU in the present invention will achieve a transfer of the VOCs from the water into the carbon arc core. The VOCs within the core will be thermally oxidized. This illustrates that the present invention can be utilized as a thermal oxidizer.

Spent Caustic

Spent caustic solutions generated from refineries and petrochemical facilities are usually considered a hazardous waste due to the presence of benzene. It is believed that the present invention, utilizing, preferably, Revex™. MTU apparatus, can clean the spent caustic by stripping the benzene from the caustic solution and subsequently decomposing the benzene within the apparatus with the carbon arc plasma.

COD-Chemical Oxygen Demand

Not being bound by theory it is believed that the carbon arc/gas-sparged hydrocyclone system can reduce COD in industrial wastewater. To the extent that the COD is not completely oxidized to carbon dioxide and water, it is believed that the present invention will convert COD into organic matter that can be decomposed in a biological wastewater treatment facility.

The foregoing description of the apparatus and methods of the invention in preferred and alternative embodiments and variations, and the foregoing examples of processes for which the invention may be beneficially used, are intended to be illustrative and not for purposes of limitation. The invention is susceptible to still further variations and alternative embodiments within the full scope of the invention, recited in the following claims.

What is claimed is:

1. An apparatus for treating a substance comprising:
a volute or cyclone head having an inlet and an outlet;
a throat having a first opening, a second opening and a central axis, wherein the first opening is connected to the outlet of the volute or cyclone head;
a parabolic reflector having a vertex, a focus and an opening at the vertex, wherein the opening is connected to the second opening of the throat such that the vertex and focus are axially aligned with the central axis and the focus is not located within the throat;
a first wave energy source comprising a first electrode within the volute or cyclone head that extends through the outlet into the first opening of the throat along the central axis of the throat, and a second electrode extending into the parabolic reflector proximate to the focus wherein the second electrode is spaced apart and axially aligned with first electrode;
a second wave energy source disposed inside the throat, embedded within the throat or disposed around the throat; and
wherein the substance is supplied to the inlet of the volute or cyclone head, and irradiated with one or more wave energies produced by the first and second wave energy sources.

2. The apparatus as recited in claim 1, wherein the substance comprises a flowable solid, a liquid, a gas or a mixture thereof.

3. The apparatus as recited in claim 1, wherein the second wave energy source comprises one or more radio frequency coils or windings disposed inside at least a portion of the throat.

4. The apparatus as recited in claim 1, wherein the at least a portion of the throat is transparent or semi-transparent to the one or more wave energies produced by the second wave energy source.

5. The apparatus as recited in claim 4, wherein the portion of the throat that is transparent or semi-transparent comprises alumina, plastic, glass or fiberglass.

6. The apparatus as recited in claim 4, wherein the second wave energy source comprises one or more radio frequency coils or windings embedded within or disposed around at least a portion of the throat.

7. The apparatus as recited in claim 4, wherein the second wave energy source comprises a waveguide surrounding at least a portion of the throat and a microwave source coupled to the waveguide.

8. The apparatus as recited in claim 1, wherein at least a portion of the throat absorbs the one or more wave energies produced by the second wave energy source and emits an infrared radiation towards the central axis.

9. The apparatus as recited in claim 8, wherein the portion of the throat that absorbs the one or more wave energies comprises graphite or silicon carbide.

10. The apparatus as recited in claim 1, wherein the throat further comprises:
a porous inner portion; and
a throat inlet connected to the porous inner portion.

11. The apparatus as recited in claim 10, wherein a liquid or gas is introduced into the throat via the throat inlet.

12. The apparatus as recited in claim 11, wherein the liquid comprises water or hydrogen peroxide.

13. The apparatus as recited in claim 11, wherein the gas comprises a steam or a combustible gas.

14. The apparatus as recited in claim 1, wherein the second wave energy source comprises one or more plasma torches connected tangentially to the throat such that a plasma generated by the one or more plasma torches rotates within the throat in a same direction as the substance.

15. The apparatus as recited in claim 14, wherein the plasma torch comprises a third electrode having a polarity that is opposite to a polarity of the first electrode or the second electrode.

16. The apparatus as recited in claim 1, wherein the one or more wave energies comprise an ultraviolet radiation, a vacuum ultraviolet radiation, an infrared radiation, a visible light radiation, a microwave radiation, a radio frequency radiation, a sonic energy, an ultrasonic energy, an electrolysis or a combination thereof.

17. The apparatus as recited in claim 1, wherein the substance is irradiated by the one or more wave energies produced by: (a) a plasma core created by an electrical arc between the first electrode and the second electrode, (b) the second wave energy source, and (c) reflection of the one or more wave energies by the parabolic reflector.

18. The apparatus as recited in claim 17, wherein the second wave energy source is directly or inductively coupled to the plasma core.

19. The apparatus as recited in claim 18, wherein a current supplied to the first and second electrodes is reduced or turned off after the second wave energy source is coupled to the plasma core, wherein the plasma core is sustained by the second wave energy source.

20. The apparatus as recited in claim 17, wherein a first zone of wave energy is created proximate to the plasma core, and a second zone of wave energy is created within the parabolic reflector.

21. The apparatus as recited in claim 1, wherein the first and second electrodes comprise carbon, graphite or other electrically conductive material.

22. The apparatus as recited in claim 1, further comprising a central core of gas around the first wave energy source.

23. The apparatus as recited in claim 22, wherein the gas comprises oxygen, hydrogen, an inert gas or a combination thereof.

24. The apparatus as recited in claim 23, wherein the gas reduces oxidation of the first wave energy source, changes a spectrum of one or more of the wave energies or a combination thereof.

25. The apparatus as recited in claim 23, wherein the hydrogen is generated from hydrogen peroxide.

26. The apparatus as recited in claim 1, further comprising:
a power supply connected to the first electrode and the second electrode;
a mechanism to strike an arc between the first electrode and the second electrode; and
the throat is straight or cone shaped.

27. The apparatus as recited in claim 26, wherein the mechanism comprises an actuator to move the first electrode into contact with the second electrode, or a pushrod to contact the second electrode.

28. The apparatus as recited in claim 1, wherein the apparatus further comprises a tank connected to the parabolic reflector.

29. The apparatus as recited in claim 28, wherein the tank includes one or more filters or a filter media.

30. The apparatus as recited in claim 29, wherein a third zone of wave energy is created proximate to the one or more filters or the filter media.

31. The apparatus as recited in claim 1, wherein the parabolic reflector is coated with a catalyst.

32. The apparatus as recited in claim 1, wherein the second wave energy source is further disposed around the parabolic reflector.

33. The apparatus as recited in claim 32, wherein the parabolic reflector is transparent or semi-transparent to the one or more wave energies produced by the second wave energy source and is reflective to ultraviolet light.

34. An apparatus for treating a solid, a liquid, a gas or a mixture thereof comprising:
a volute or cyclone head having an inlet and an outlet;
a throat having a first opening, a second opening and a central axis wherein the first opening is connected to the outlet of the volute or cyclone head;
a parabolic reflector having a vertex, a focus and an opening at the vertex, wherein the opening is connected to the second opening of the throat such that the vertex and focus are axially aligned with the central axis and the focus is not located within the throat;
a first wave energy source comprising a first electrode within the volute or cyclone head that extends through the outlet into the first opening of the throat along the central axis of the throat, and a second electrode extending into the parabolic reflector proximate to the focus wherein the second electrode is spaced apart and axially aligned with first electrode;
a second wave energy source disposed inside the throat, embedded within the throat or disposed around the throat;
a power supply connected to the first electrode and the second electrode;
a mechanism to strike an arc between the first electrode and the second electrode; and
the flowable solid, the liquid, the gas or the mixture thereof is supplied to the inlet of the volute or cyclone head, and irradiated with one or more wave energies produced by: (a) a plasma core created by an electrical arc between the first electrode and the second electrode, and (b) the second wave energy source, and (c) reflection of the one or more wave energies by the parabolic reflector.

35. The apparatus as recited in claim 34, the second wave energy source comprises: (a) one or more radio frequency coils or windings disposed inside at least a portion of the throat, (b) one or more radio frequency coils or windings embedded within or disposed around the portion of the throat, or (c) a waveguide surrounding the portion of the throat and a microwave source coupled to the waveguide.

36. The apparatus as recited in claim 35, wherein the portion of the throat is transparent or semi-transparent to the one or more wave energies produced by the second wave energy source.

37. The apparatus as recited in claim 35, wherein the portion of the throat that is transparent or semi-transparent comprises alumina, plastic, glass or fiberglass.

38. The apparatus as recited in claim 35, wherein the portion of the throat absorbs the one or more wave energies produced by the second wave energy source and emits an infrared radiation towards the central axis.

39. The apparatus as recited in claim 38, wherein the portion of the throat that absorbs the one or more wave energies comprises graphite or silicon carbide.

40. The apparatus as recited in claim 34, wherein the throat further comprises:
a porous inner portion; and
a throat inlet connected to the porous inner portion.

41. The apparatus as recited in claim 40, wherein a liquid or gas is introduced into the throat via the throat inlet.

42. The apparatus as recited in claim 34, wherein the second wave energy source comprises one or more plasma torches connected tangentially to the throat such that a plasma generated by the one or more plasma torches rotates within the throat in a same direction as the flowable solid, the liquid, the gas or the mixture thereof.

43. The apparatus as recited in claim 42, wherein the plasma torch comprises a third electrode having a polarity that is opposite to a polarity of the first electrode or the second electrode.

44. The apparatus as recited in claim 34, wherein the second wave energy source is directly or inductively coupled to the plasma core.

45. The apparatus as recited in claim 44, wherein a current supplied to the first and second electrodes is reduced or turned off after the second wave energy source is coupled to the plasma core, wherein the plasma core is sustained by the second wave energy source.

46. The apparatus as recited in claim 34, wherein a first zone of wave energy is created proximate to the plasma core, and a second zone of wave energy is created within the parabolic reflector.

47. The apparatus as recited in claim 34, further comprising a central core of gas around the first wave energy source.

48. The apparatus as recited in claim 47, wherein the gas reduces oxidation of the first wave energy source, changes a spectrum of one or more of the wave energies or a combination thereof.

49. The apparatus as recited in claim 34, wherein the throat is straight or cone shaped.

50. The apparatus as recited in claim 34, wherein the mechanism comprises an actuator to move the first electrode into contact with the second electrode, or a pushrod to contact the second electrode.

51. The apparatus as recited in claim 34, further comprising a tank connected to the parabolic reflector.

52. The apparatus as recited in claim 51, wherein the tank includes one or more filters or a filter media.

53. The apparatus as recited in claim 51, wherein a third zone of wave energy is created proximate to the one or more filters or the filter media.

54. The apparatus as recited in claim 34, wherein the parabolic reflector is coated with a catalyst.

55. The apparatus as recited in claim 34, wherein the second wave energy source is further disposed around the parabolic reflector.

56. The apparatus as recited in claim 55, wherein the parabolic reflector is transparent or semi-transparent to the one or more wave energies produced by the second wave energy source and is reflective to ultraviolet light.

* * * * *